(12) United States Patent
Wu et al.

(10) Patent No.: US 12,356,063 B2
(45) Date of Patent: Jul. 8, 2025

(54) PHOTOGRAPHING METHOD AND DEVICE

(71) Applicant: Huawei Technologies Co., Ltd., Shenzhen (CN)

(72) Inventors: Lei Wu, Shanghai (CN); Yihua Zeng, Shenzhen (CN); Huanwen Peng, Shenzhen (CN); Hongqiao Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 333 days.

(21) Appl. No.: 17/923,276

(22) PCT Filed: Mar. 1, 2021

(86) PCT No.: PCT/CN2021/078507
§ 371 (c)(1),
(2) Date: Nov. 4, 2022

(87) PCT Pub. No.: WO2021/223500
PCT Pub. Date: Nov. 11, 2021

(65) Prior Publication Data
US 2023/0328356 A1    Oct. 12, 2023

(30) Foreign Application Priority Data
May 7, 2020 (CN) .......................... 202010378102.2

(51) Int. Cl.
*H04N 23/61*    (2023.01)
*H04N 23/63*    (2023.01)
(Continued)

(52) U.S. Cl.
CPC ........... *H04N 23/61* (2023.01); *H04N 23/631* (2023.01); *H04N 23/634* (2023.01);
(Continued)

(58) Field of Classification Search
CPC ...... H04N 23/61; H04N 23/611; H04N 23/62; H04N 23/667; H04N 23/80; H04N 23/631; H04N 5/272; H04N 5/265
See application file for complete search history.

(56) References Cited

U.S. PATENT DOCUMENTS 8,212,895 B2 * 7/2012 Nakamura ........... H04N 5/2621
348/333.02
2006/0017837 A1   1/2006 Sorek et al.
(Continued)

FOREIGN PATENT DOCUMENTS

CN    104270565 A    1/2015
CN    105589506 A    5/2016
(Continued)

*Primary Examiner* — Daniel M Pasiewicz
(74) *Attorney, Agent, or Firm* — Conley Rose. P.C.

(57) ABSTRACT

A photographing method and a device configured to capture, in a slow shutter exposure mode, a photo in which a subject image is clear and a background image has a motion blur, so as to improve a photographing experience. The device may display a preview image with an image of a first object in a preview background image having a motion blur, and a preview subject image not having a motion blur. The device may display an intermediate image on a photographing interface after detecting a photographing operation. On the intermediate image, an image of a second object in an intermediate background image has a motion blur, and an intermediate subject image does not have a motion blur. On a generated photo, an image of the second object in a target background image has a motion blur, and a target subject image does not have a motion blur.

20 Claims, 18 Drawing Sheets

(51) Int. Cl.
  *H04N 23/667* (2023.01)
  *H04N 23/80* (2023.01)
  *H04N 5/272* (2006.01)

(52) U.S. Cl.
  CPC ........... *H04N 23/667* (2023.01); *H04N 23/80* (2023.01); *H04N 5/272* (2013.01)

(56) References Cited

U.S. PATENT DOCUMENTS

| | | | | |
|---|---|---|---|---|
| 2009/0096897 | A1* | 4/2009 | Saito | H04N 23/80 348/241 |
| 2010/0265353 | A1* | 10/2010 | Koyama | H04N 23/951 348/222.1 |
| 2014/0211034 | A1* | 7/2014 | Tanaka | H04N 23/80 348/218.1 |
| 2016/0125633 | A1* | 5/2016 | Windmark | G06T 7/246 382/103 |
| 2016/0301868 | A1 | 10/2016 | Acharya et al. | |
| 2017/0019608 | A1 | 1/2017 | Ono | |
| 2017/0034429 | A1 | 2/2017 | Huysegems et al. | |
| 2017/0318226 | A1* | 11/2017 | Jung | H04N 23/633 |
| 2018/0160021 | A1* | 6/2018 | Zhou | H04N 23/634 |
| 2020/0051218 | A1* | 2/2020 | Hyun | G06T 7/194 |
| 2021/0287343 | A1* | 9/2021 | Kaida | H04N 23/80 |
| 2022/0210343 | A1* | 6/2022 | Leshem Gat | H04N 23/64 |

FOREIGN PATENT DOCUMENTS

| | | |
|---|---|---|
| CN | 105847674 A | 8/2016 |
| CN | 106165389 A | 11/2016 |
| CN | 106170976 A | 11/2016 |
| CN | 106791380 A | 5/2017 |
| CN | 106791382 A | 5/2017 |
| CN | 107333056 A | 11/2017 |
| CN | 108055477 A | 5/2018 |

\* cited by examiner (a) (b)

PHOTOGRAPHING METHOD AND DEVICE

CROSS-REFERENCE TO RELATED APPLICATIONS

This is a U.S. National Stage of International Patent Application No. PCT/CN2021/078507 filed on Mar. 1, 2021, which claims priority to Chinese Patent Application No. 202010378102.2 filed on May 7, 2020. Both of the aforementioned applications are hereby incorporated by reference in their entireties.

TECHNICAL FIELD

Embodiments of this application relate to the field of electronic technologies, and in particular, to a photographing method and a device.

BACKGROUND

With development of electronic technologies, a mobile terminal such as a mobile phone or a tablet computer has an increasingly powerful camera function. For example, the mobile terminal such as the mobile phone may capture images with different effects in modes such as a wide aperture mode, a night mode, and a multi-channel video recording mode. For a slow shutter photographing function, a professional camera such as a single-lens reflex camera can implement slow shutter photographing through long-time exposure of a photosensitive chip, but it is difficult for the mobile terminal such as the mobile phone to implement slow shutter photographing.

SUMMARY

Embodiments of this application provide a photographing method and a device, to capture, in a slow shutter exposure mode, a photo in which a foreground image including a subject is clear and a background image has a motion blur, so as to improve photographing experience of a user.

To achieve the foregoing objective, the following technical solutions are used in embodiments of this application.

According to one aspect, an embodiment of this application provides a photographing method, applied to an electronic device having a camera. The camera is configured to capture an image. The method includes: The electronic device enters a target photographing mode. The electronic device displays a first preview image on a preview interface, where the first preview image includes a preview subject image and a preview background image, an image of a first object in the preview background image has a motion blur, and the preview subject image does not have a motion blur. The electronic device displays an intermediate image (which may also be referred to as a captured image) on a photographing interface after detecting a photographing operation, where the intermediate image includes an intermediate subject image (which may also be referred to as a captured subject image) and an intermediate background image (which may also be referred to as a captured background image), an image of a second object in the intermediate background image has a motion blur, and the intermediate subject image does not have a motion blur. The electronic device stops photographing and generates a photo, where the photo includes a target subject image and a target background image, an image of the second object in the target background image has a motion blur, and the target subject image does not have a motion blur.

The preview subject image, the intermediate subject image, and the target subject image are all images of a subject, and the target photographing mode may be a slow shutter exposure mode. In this solution, in the target photographing mode, the electronic device may present, to a user on both the preview interface in a preview process and the photographing interface in a photographing process, an image effect that a subject image is clear and a background image has a motion blur. In addition, the photo capture by the electronic device also has an effect that a subject image is clear and a background image has a motion blur, to implement a slow shutter photographing effect and improve photographing experience of the user. The method is applicable to a scene in which a moving object exists in a photographing range and the subject keeps still.

In a possible design, before the electronic device enters the target photographing mode, the method further includes: The electronic device enters a photo mode. That the electronic device enters a target photographing mode includes: If the electronic device detects a moving object within a photographing range, the electronic device automatically enters the target photographing mode.

In other words, if the electronic device detects a moving object within the photographing range, the electronic device may determine that a current scene is a slow shutter photographing scene, so that the electronic device can automatically enter the target photographing mode.

In another possible design, that the electronic device detects the moving object within the photographing range includes: The electronic device detects the moving object within a background range of the photographing range.

Usually, the subject is close to the camera and is usually located in a foreground range, and the moving object in the background is usually located in the background range. Therefore, the electronic device can detect whether the moving object exists within the background range.

In another possible design, after the electronic device enters the target photographing mode, the method further includes: The electronic device generates a raw image based on an image captured by the camera. The electronic device displays the raw image on the preview interface. The electronic device recognizes a subject based on the raw image. The electronic device prompts that the subject is recognized.

In other words, the electronic device may automatically recognize, based on the generated raw image, the subject that the user may be interested in, and prompt the user with the subject.

In another possible design, the method further includes: If the electronic device does not recognize the subject, the electronic device prompts a user to specify a subject. The electronic device determines the subject based on an indication operation of the user on an object in the raw image. The electronic device prompts the determined subject.

It may be understood that if the electronic device fails to recognize the subject, the electronic device may prompt the user to specify the subject.

In another possible design, that the electronic device displays a first preview image on a preview interface includes: The electronic device performs image segmentation on a plurality of generated frames of raw images based on the subject, and separately obtains a subject image and a background image, where the subject image includes the subject, and the background image includes the first object that moves. The electronic device registers and overlays background images in the $i^{th}$ group of N adjacent frames of raw images to generate a preview background image i, where i is a positive integer, N is an integer greater than 1, and an image of the first object in the preview background image i has a motion blur. A middlemost frame of subject image or a frame of subject image close to the middle in the $i^{th}$ group of N adjacent frames of raw images is a preview subject image i, or a subject image in a last captured frame of raw image in the N adjacent frames of raw images is the preview subject image i. The electronic device fuses the preview background image i and the preview subject image i to generate a preview image i. The electronic device displays the preview image i on the preview interface, where the preview image i is first preview image. When i is two consecutive integers, two adjacent groups of N frames of raw images are slid in a sliding window mode.

In this way, the electronic device may use a sliding window whose length is N to perform image processing in N adjacent frames, to generate a preview image and display the preview image on the preview interface.

In another possible design, the preview interface includes one or more of the following:

first prompt information, used to prompt that the target photographing mode has been entered; second prompt information, used to prompt a photographer and the subject to keep still after the photographing is started; third prompt information, used to prompt that a countdown is performed after the photographing is started; fourth prompt information, used to prompt a speed of a moving object; and fifth prompt information, used to prompt a recommended rate value, where the rate value is used to indicate a quantity K of overlaid frames of background images in a photographing process after the photographing is started.

In other words, the electronic device may prompt the user with a plurality of types of information on the preview interface, so that the user can conveniently take a photo in the slow shutter photographing mode.

In another possible design, the preview interface further includes a rate control used to set a rate value, and the rate value is used to indicate a quantity K of overlaid frames of background images in a photographing process after photographing starts.

In this way, the user can conveniently learn of a quantity of overlaid background images in the photographing process by using the rate control. In addition, the user can further adjust a quantity of overlaid frames of background images in the photographing process by using the rate control.

In another possible design, the photographing interface includes one or more of the following: sixth prompt information, used to prompt the photographer and the subject to keep still after the photographing is started; and seventh prompt information, used to prompt the subject.

In other words, the electronic device may prompt the user with related information on the photographing interface, so that the user can conveniently take a photo in the slow shutter photographing mode.

In another possible design, the photographing interface includes a countdown control, and the method further includes: After detecting the photographing operation, the electronic device starts a countdown of first duration by using the countdown control, and prompts the user with remaining duration of the countdown. The stopping photographing includes: Before the countdown ends, if the electronic device detects a photographing stop operation, the electronic device stops photographing; or before the countdown ends, if the electronic device detects that a shake amplitude of the electronic device is greater than or equal to a first preset value or a shake amplitude of the subject is greater than or equal to a second preset value, the electronic device stops photographing; or after the countdown ends, the electronic device stops photographing.

In the photographing process in the slow shutter photographing mode, if the subject or the photographer shakes greatly, an obtained raw image is blurred, a photo obtained by processing the raw image is also blurred, and a photographing effect is poor. Therefore, photographing may be stopped, and a previous photographing result may be used as a final captured photo.

In another possible design, the first duration is associated with one or more of the following: a moving speed of the first object, a capture frame rate of the camera, or a rate value, and the rate value is used to indicate a quantity K of overlaid frames of background images in a photographing process after the photographing is started.

In other words, the countdown photographing duration may be determined based on one or more of the moving speed of the first object, the capture frame rate of the camera, or the rate value.

In another possible design, that the electronic device displays an intermediate image on a photographing interface after detecting a photographing operation includes: After detecting the photographing operation, the electronic device generates a first raw image based on the image captured by the camera. The electronic device performs image segmentation on the first raw image to obtain a first subject image and a first background image. After detecting the photographing operation, the electronic device generates the $j^{th}$ raw image based on the image captured by the camera, where j is an integer greater than 1 and less than or equal to K, K corresponds to a rate value, and the rate value is used to indicate a quantity K of overlaid frames of background images in a photographing process after the photographing is started. The electronic device performs image segmentation on the $j_{th}$ raw image, to obtain the $j^{th}$ subject image and the $j_{th}$ background image. The electronic device registers the $j_{th}$ background image and the first background image. The electronic device overlays the $j_{th}$ background image and the $(j-2)^{th}$ overlaid background image, to obtain the $(j-1)^{th}$ overlaid background image, where the $(j-2)^{th}$ background image includes the second object, an image of the second object has a motion blur, and when j is 2, the $(j-2)^{th}$ overlaid background image is the first background image. The $j^{th}$ intermediate subject image is a frame of subject image with highest brightness in the first i frames of subject images. The electronic device fuses the $(j-1)^{th}$ overlaid background image and the $j_{th}$ intermediate subject image, to generate the $(j-1)^{th}$ composite image. The electronic device displays the $(j-1)^{th}$ composite image on the photographing interface, where the $(j-1)^{th}$ composite image is the intermediate image.

In the photographing process, the electronic device may perform accumulative overlay on the background images to obtain the intermediate background image, may select a brightest frame from the subject images as the intermediate subject image, fuse the intermediate background image and the intermediate subject image, and display the fused image on the photographing interface. Therefore, an image effect that a subject image is clear and has high brightness and a background image has a motion blur can be presented to the user in the photographing process.

In another possible design, the method further includes: The electronic device determines that a quantity of frames of images captured by the camera in the first duration is less than K After the electronic device detects the photographing operation, the method further includes: The electronic device performs frame interpolation on the raw image that is generated based on the image captured by the camera, to obtain K frames of raw images in the first duration.

In other words, before the photographing process is started, the electronic device may first determine, in a preview state, whether the K frames of images can be captured within the first duration of the countdown. If the K frames of images cannot be captured, the K frames of raw images specified by the rate value cannot be obtained. Therefore, after the photographing is started, frame interpolation may be performed to obtain the K frames of raw images, to obtain an effect of a long motion blur.

In another possible design, the photo is the $(j-1)^{th}$ composite image recently generated before the photographing is stopped. If the photographing is stopped before the countdown ends, j is less than or equal to K; or if the photographing is stopped after the countdown ends, j is equal to K.

In other words, before the countdown, the electronic device may obtain raw images of K frames or less than K frames, and may generate composite images of K−1 frames or less than K−1 frames, and a recently generated composite image is the finally captured photo. After the countdown ends, the electronic device obtains the K frames of raw images, and generates the K−1 frames of composite images, and the $(K-1)^{th}$ frame of composite image is the finally captured photo.

In another possible design, the subject is one person; or the subject is a plurality of persons with a same depth of field.

According to another aspect, embodiments of this application provide an electronic device, including: a camera, configured to capture an image; a screen, configured to display an interface; one or more processors; a memory; and one or more computer programs. The one or more computer programs are stored in the memory, and the one or more computer programs include instructions. When the instructions are executed by the electronic device, the electronic device is enabled to perform the photographing method performed by the electronic device in any possible design of the foregoing aspect.

According to another aspect, embodiments of this application provide a photographing apparatus. The apparatus is included in an electronic device. The apparatus has a function of implementing behavior of the electronic device in any method in the foregoing aspects and the possible designs, so that the electronic device performs the photographing method performed by the electronic device in any possible design of the foregoing aspect. The function may be implemented by hardware, or may be implemented by hardware executing corresponding software. The hardware or the software includes at least one module or unit corresponding to the foregoing function. For example, the apparatus may include a processing unit, a display unit, a detection unit, and the like.

According to still another aspect, embodiments of this application provide an electronic device, including: a camera, configured to capture an image; a screen, configured to display an interface; one or more processors; and a memory. The memory stores code. When the code is executed by the electronic device, the electronic device is enabled to perform the photographing method performed by the electronic device in any possible design of the foregoing aspects.

According to still another aspect, embodiments of this application provide an electronic device, including one or more processors and a memory. The memory stores code. When the code is executed by the electronic device, the electronic device is enabled to perform the photographing method performed by the electronic device in any possible design of the foregoing aspects.

According to another aspect, embodiments of this application provide a computer-readable storage medium, including computer instructions. When the computer instructions are run on an electronic device, the electronic device is enabled to perform the photographing method in any possible design of the foregoing aspects.

According to still another aspect, embodiments of this application provide a computer program product. When the computer program product is run on a computer, the computer is enabled to perform the photographing method performed by the electronic device in any possible design of the foregoing aspects.

According to another aspect, embodiments of this application provide a chip system, and the chip system is used in an electronic device. The chip system includes one or more interface circuits and one or more processors. The interface circuit and the processor are interconnected through a line. The interface circuit is configured to receive a signal from a memory of the electronic device, and send the signal to the processor. The signal includes computer instructions stored in the memory. When the processor executes the computer instructions, the electronic device is enabled to perform the photographing method in any possible design of the foregoing aspects.

For beneficial effects corresponding to the another aspect, refer to descriptions of beneficial effects in the method aspect. Details are not described herein again.

DESCRIPTION OF EMBODIMENTS

Figure 1:
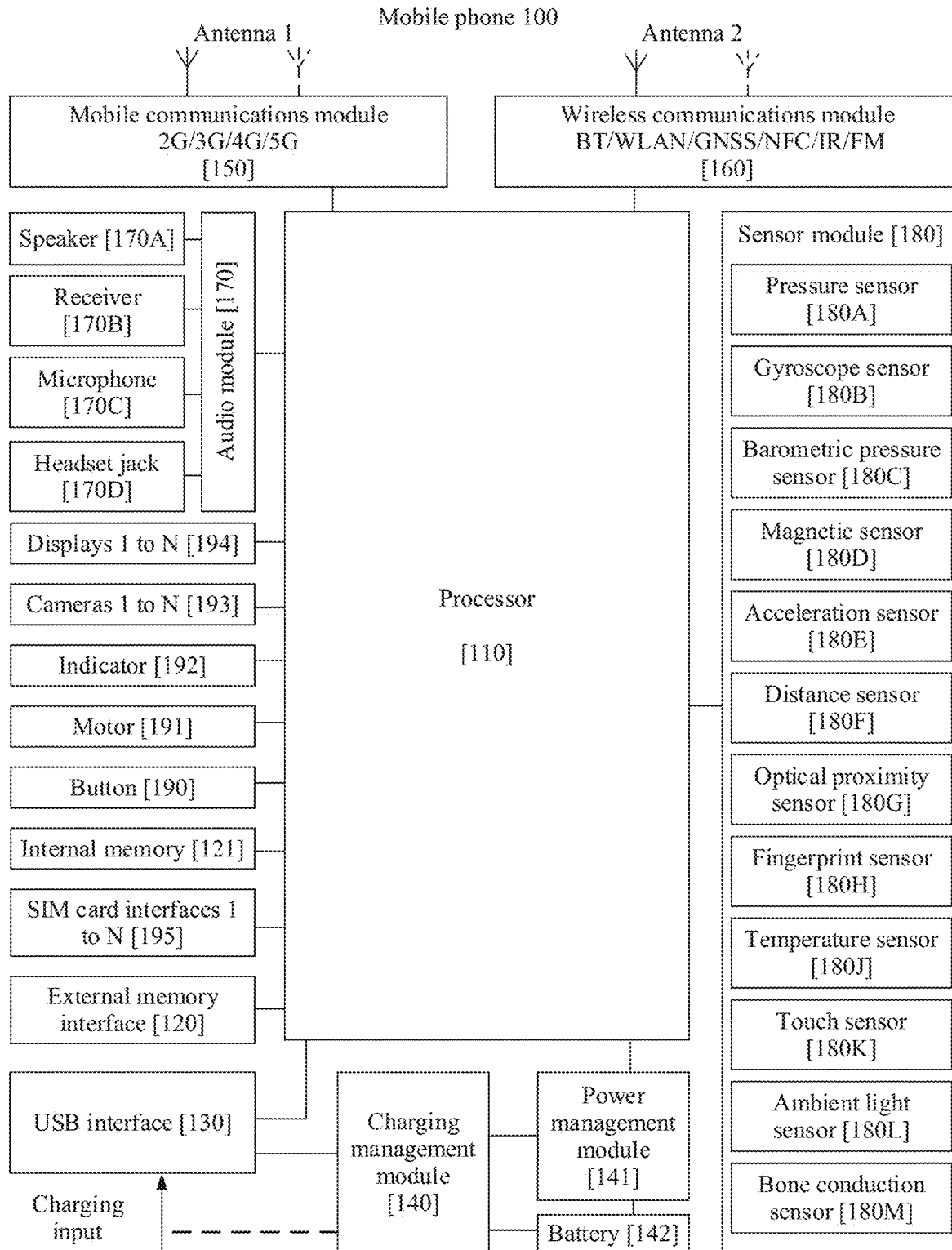
FIG. 1 is a schematic diagram of a hardware structure of a mobile phone according to an embodiment of this application.

The following describes the technical solutions in embodiments of this application with reference to the accompanying drawings in the embodiments of this application. In description in embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions in embodiments of this application, "a plurality of" means two or more.

The following terms "first" and "second" are merely intended for description, and shall not be understood as an indication or implication of relative importance or implicit indication of a quantity of indicated technical features. Therefore, a feature limited by "first" or "second" may explicitly or implicitly include one or more features. In the descriptions of embodiments, unless otherwise stated, "a plurality of" means two or more than two.

A subject in embodiments of this application may be a photographed object that can keep still in a photographing process, for example, a person, an animal, a doll, a building, or a plant that a user is interested in, Within a photographing range of an electronic device, a range beyond the subject may be referred to as a backdrop range. In addition, a foreground range may be within a focal length range of an imaging system of the electronic device, and a background range may be beyond the focal length range of the imaging system.

An image obtained by the electronic device may include a subject image and a background image. The subject image is an image in a region occupied by a photographed subject, and the background image is an image in a region other than the subject image. From a perspective of a depth of field, an image obtained by the electronic device may include a foreground image and a background image. The foreground image is an image within the focal length range of the imaging system, and a depth of field of the foreground image is smaller. The background image is an image beyond the focal length range of the imaging system, and a depth of field of the background image is larger. The subject image may be a foreground image, or may be a background image.

Embodiments of this application provide a photographing method, which may be applied to an electronic device, to take a photo that has a slow shutter exposure effect and that has a clear subject image without a motion blur but a background image with a motion blur (or referred to as ghosting, blurring, or the like), so as to improve photographing experience of a user. The method is applicable to a scene in which a photographed subject keeps still but a moving object (for example, a vehicle flow or a people flow) exists in a background range in a photographing process.

For example, the electronic device may be a mobile terminal such as a mobile phone, a tablet computer, a wearable device, a vehicle-mounted device, an augmented reality (augmented reality, AR)/virtual reality (virtual reality, VR) device, a notebook computer, an ultra-mobile personal computer (ultra-mobile personal computer, UMPC), a netbook, or a personal digital assistant (personal digital assistant, PDA), or may be a device such as a professional camera. A specific type of the electronic device is not limited in embodiments of this application.

For example, the electronic device is a mobile phone. FIG. 1 is a schematic diagram of a structure of a mobile phone 100. The mobile phone 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module. SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180I, a bone conduction sensor 180M, an infrared sensor, or the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent devices, or may be integrated into one or more processors.

The mobile phone 100 implements a display function by using the GPU, the display 194, the application processor, and the like. The GPU is a microprocessor for image processing, and connects the display 194 to the application processor. The GPU is configured to perform mathematical and geometric calculation, and perform graphics rendering. The processor 110 may include one or more GPUs that execute program instructions to generate or change display information.

The display 194 is configured to display an image, a video, or the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flex light-emitting diode, FLED), a mini-LED, a micro-LED, a micro-OLED, a quantum dot light-emitting diode (quantum dot light-emitting diodes, QLED), or the like. In some embodiments, the mobile phone 100 may include one or N displays 194, where N is a positive integer greater than 1.

The mobile phone 100 may implement a photographing function by using the ISP, the camera 193, the video codec, the GPU, the display 194, the application processor, and the like.

The ISP is configured to process data fed back by the camera 193. For example, during photographing, a shutter is pressed, light is transferred to a camera photosensitive element through a lens, an optical signal is converted into an electrical signal, and the camera photosensitive element transmits the electrical signal to the ISP for processing, to convert the electrical signal into a visible image. The ISP may further perform algorithm optimization on noise, brightness, and complexion of the image. The ISP may further optimize parameters such as exposure and color temperature of a photographing scene. In some embodiments, the ISP may be disposed in the camera 193.

The camera 193 is configured to capture a static image or a video. An optical image of an object is generated through the lens, and is projected onto the photosensitive element. The photosensitive element may be a charge-coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into a standard image signal in a format such as RGB or YUV. An image processed by the ISP may be referred to as a raw image. In some embodiments, the mobile phone 100 may include one or N cameras 193, where N is a positive integer greater than 1.

In embodiments of this application, the camera 193 may include a color camera and/or a monochrome camera. In addition, the camera 193 may include one or more of the following cameras: a long-focus camera, a wide-angle camera, an ultra-wide-angle camera, a zoom camera, a depth camera, or the like. The long-focus camera has a small photographing range, and is applicable to photographing a distant scene. A photographing range of the wide-angle camera is large. The ultra-wide-angle camera has a photographing range larger than that of the wide-angle camera, and is applicable to photographing a scene with a large picture such as a panorama. The depth camera may be configured to measure a distance of a photographed object, for example, may include a three-dimensional (3 Dimensions, 3D) depth camera, a time-of-flight (time of flight, TOO depth camera, or a binocular depth camera. The depth camera may assist the processor 110 in image segmentation, to distinguish between a subject image and a background image.

The digital signal processor is configured to process a digital signal. In addition to the digital image signal, the digital signal processor may further process another digital signal. For example, when the mobile phone 100 selects a frequency, the digital signal processor is configured to perform Fourier transform on frequency energy, and the like.

The video codec is configured to compress or decompress a digital video. The mobile phone 100 may support one or more video codecs. In this way, the mobile phone 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information by referring to a biological neural network structure, for example, by referring to a mode of transfer between human brain neurons, and may further continuously perform self-learning. Applications such as intelligent cognition of the mobile phone 100 may be implemented by using the NPU, for example, image recognition (for example, subject recognition in embodiments of this application), image segmentation (for example, segmentation of a subject image and a background image in embodiments of this application), facial recognition, speech recognition, or text understanding.

The internal memory 121 may be configured to store computer executable program code. The executable program code includes instructions. The processor 110 runs the instructions stored in the internal memory 121, to perform various function applications of the mobile phone 100 and data processing. The internal memory 121 may include a program storage area and a data storage area. The program storage area may store an operating system, an application required by at least one function (for example, a sound playing function or an image playing function), and the like. The data storage area may store data (such as audio data and an address book) and the like created during use of the mobile phone 100. In addition, the internal memory 121 may include a high-speed random access memory, or may include a nonvolatile memory, for example, al least one magnetic disk storage device, a flash memory, or a universal flash storage (universal flash storage, UFS).

In embodiments of this application, the processor 110 (for example, an NPU) may recognize a subject. The processor 110 (for example, an NPU) may segment a raw image with the help of another depth auxiliary device such as the TOF depth camera, the binocular depth camera, or the infrared sensor, to distinguish a subject image in a region occupied by the subject (that is, an image in the region occupied by the subject) and a background image in another region, and separately process the subject image and the background image, so that the processed subject image is clearer and the processed background image has a motion blur.

The touch sensor 180K is alternatively referred to as a "touch panel". The touch sensor 180K may be disposed on the display 194, and the touch sensor 180K and the display 194 constitute a touchscreen, which is also referred to as a "touch screen". The touch sensor 180K is configured to detect a touch operation acting on or near the touch sensor 180K. The touch sensor may transfer the detected touch operation to the application processor, to determine a type of a touch event. The display 194 provides a visual output related to the touch operation. In some other embodiments, the touch sensor 180K may alternatively be disposed on a surface of the mobile phone 100, and is located on a position different from that of the display 194.

It may be understood that the structure shown in this embodiment of this application does not constitute a specific limitation on the mobile phone 100. In some other embodiments of this application, the mobile phone 100 may include more or fewer components than those shown in the figure, or some components may be combined, or some components may be split, or there may be a different component layout. The components shown in the figure may be implemented by hardware, software, or a combination of software and hardware.

In embodiments of this application, after entering a slow shutter exposure mode, the camera 193 captures an image, and the image is processed by the ISP to generate a raw image. The processor 110 may recognize a subject based on the raw image. The processor 110 (for example, the NPU) may segment the raw image with the help of another depth auxiliary device such as the TOF depth camera, the binocular depth camera, or the infrared sensor, to distinguish between a subject image of a region occupied by the subject and a background image, and separately process the subject image and the background image. The display 194 displays, on a preview interface, a preview image in which a subject image is clear and a background image has a motion blur. After a detection component such as the touch sensor detects a photographing operation of a user, the processor 110 (for example, the NPU) segments the raw image to distinguish between the subject image and the background image, and separately processes the subject image and the background image. The display 194 displays, on a photographing interface, an image in which a subject image is clear and a background image has a motion blur. The mobile phone 100 captures a photo in which a subject image is clear and has no motion blur but a background image has a motion blur.

Figure 2:
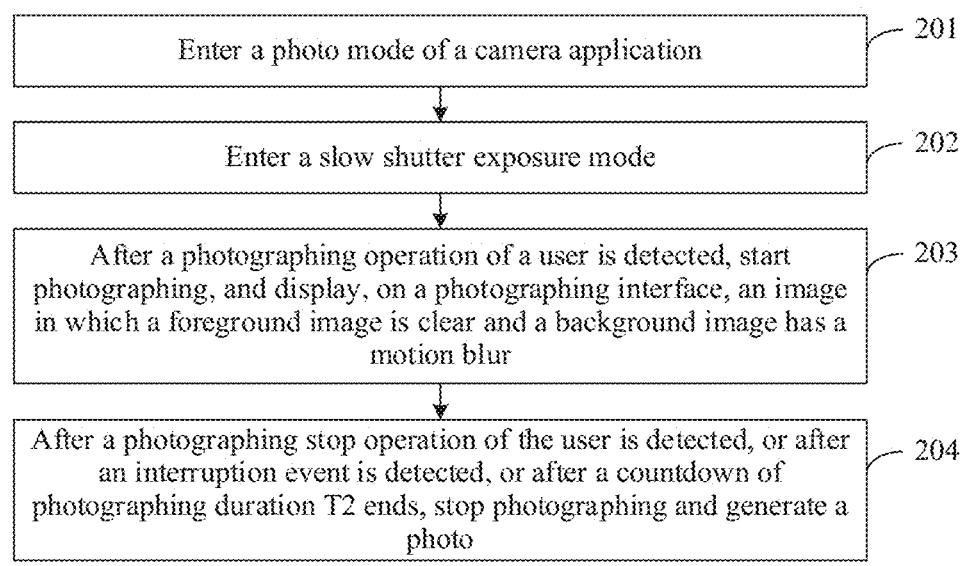
FIG. 2 is a flowchart of a photographing method according to an embodiment of this application.

With reference to the accompanying drawings, the following embodiments describe the photographing method provided in embodiments of this application by using an example in which the electronic device is a mobile phone having the structure shown in FIG. 1. As shown in FIG. 2, the method may include the following steps.

201: A mobile phone enters a photo mode of a camera application.

After detecting an operation of opening the camera application by a user, the mobile phone may start the camera application (which may also be referred to as a camera). After starting the camera application, the mobile phone may enter the photo mode, and display a preview interface in a preview state.

Figure 3A:
FIG. 3(a) and FIG. 3(b) are a schematic diagram of a group of interfaces according to an embodiment of this application.
Figure 3B:

For example, after detecting an operation of tapping a camera icon 301 shown in FIG. 3(*a*) by the user, the mobile phone starts the camera application, automatically enters the photo mode, and displays a preview interface shown in FIG. 3(*b*).

It should be noted that the mobile phone may further enter the photo mode in response to an operation such as a voice instruction or a shortcut gesture of the user. An operation of triggering the mobile phone to enter the photo mode is not limited in this embodiment of this application.

202: The mobile phone enters a slow shutter exposure mode.

In the photo mode, there may be a plurality of solutions for the mobile phone to enter the slow shutter exposure mode. The following separately describes different solutions. In the slow shutter exposure mode, the mobile phone may capture a photo in which a subject image is clear and has no motion blur but a background image has a motion blur.

Solution 1: After entering the photo mode, the mobile phone automatically recognizes whether a current scene is a slow shutter photographing scene. If the current scene is the slow shutter photographing scene, the mobile phone automatically enters the slow shutter exposure mode. In addition, the mobile phone may further prompt the user that the slow shutter exposure mode is currently entered. If the user does not want to use the slow shutter exposure mode to take a photo, the user may indicate the mobile phone to exit the slow shutter exposure mode.

After entering the photo mode, the mobile phone may continuously capture images by using the camera. A raw image may be generated after the image captured by the camera is processed by the ISP In the photo mode, when detecting, based on the raw image, that a moving object exists in a photographing range, the mobile phone may determine that the current scene is the slow shutter photographing scene. In addition, to improve a photographing effect, in some technical solutions, when detecting, based on the raw image, that a fast moving object whose moving speed is higher than or equal to a preset threshold VI exists in the photographing range, the mobile phone determines that the current scene is the slow shutter photographing scene.

For example, after entering the photo mode, the mobile phone performs motion detection on two adjacent frames of raw images. For example, the mobile phone may calculate, by using an optical flow tracking method, an optical flow motion vector of an object (or a feature point) in a latter frame of raw image in the two adjacent frames of raw images relative to a same object in a former frame of raw image. An optical flow represents a mode motion speed in a time-varying image. When an object is moving, a brightness mode of a corresponding point of the object in an image is also moving. An optical flow field is a two-dimensional instantaneous velocity field formed by all pixels in an image, and a two-dimensional velocity vector (that is, an optical flow motion vector herein) is a projection of a three-dimensional velocity vector of a visible point in an object on an imaging plane. For example, the optical flow motion vector may be represented as (X, Y), where X represents a quantity of pixels moved by a feature point in a horizontal direction, that is, an instantaneous moving speed of the feature point in the horizontal direction; and Y represents a quantity of pixels moved by the feature point in a vertical direction, that is, an instantaneous moving speed of the feature point in the vertical direction.

The mobile phone may divide optical flow motion vectors into a plurality of intervals based on empirical values. For example, a first interval is (0, 10) pixels, a second interval is (10, 20) pixels, a third interval is (20, 30) pixels, and a fourth interval is (30, 40) pixels. The mobile phone determines an interval within which a larger value max(X, Y) in each group of X and Y in the optical flow motion vector falls, to calculate, based on max(X, Y), an average speed in each interval and an accumulated quantity of pixels whose max(X, Y) fails within each interval. For example, assuming that a moving speed of a vehicle falls within the third interval based on an empirical value, an accumulated quantity of pixels whose max(X, Y) falls within the third interval is compared with a preset threshold N1. If the accumulated quantity of pixels whose max(X, Y) falls within the third interval is greater than the preset threshold N1, the mobile phone determines that the moving vehicle exists within the photographing range. In addition, if an accumulated quantity of pixels whose max(X, Y) fails within an interval of a maximum value (for example, the fourth interval) is greater than another preset threshold N2, the mobile phone determines that a fast moving object exists in the photographing range.

After detecting that a moving object exists in the photographing range, the mobile phone determines that the current scene is the slow shutter photographing scene. The mobile phone may prompt the user that a moving object exists in the current photographing scene or prompt the user that the current scene is the slow shutter photographing scene, and automatically enter the slow shutter exposure mode. After entering the slow shutter exposure mode, the mobile phone may further prompt the user that the slow shutter exposure mode is currently used. In some embodiments, the mobile phone may further prompt, in the preview state, the user with an image effect that can be obtained through photographing in the slow shutter exposure mode.

Figure 4:
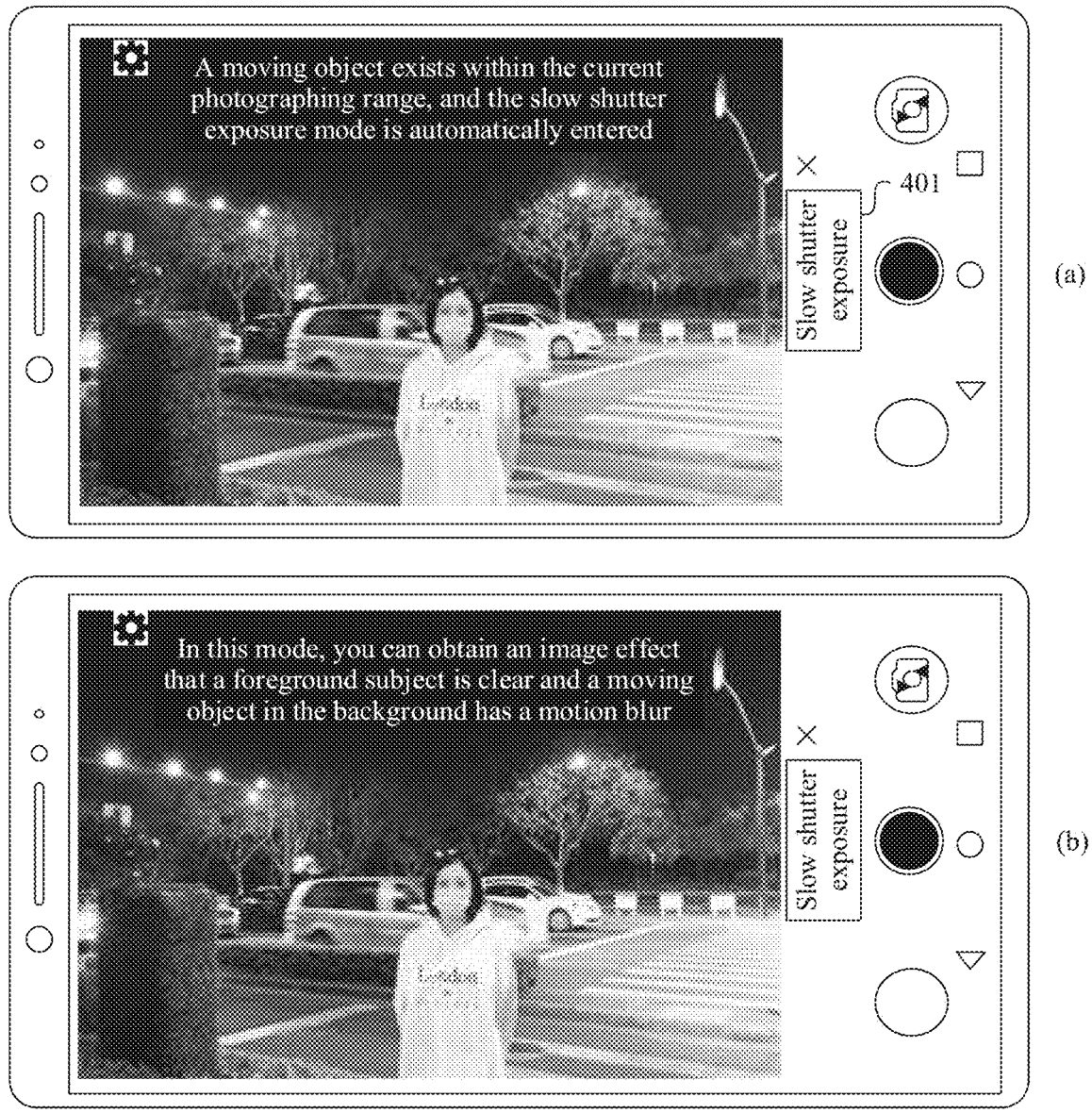
FIG. 4 is a schematic diagram of another group of interfaces according to an embodiment of this application.

For example, as shown in (a) in FIG. 4, after detecting that a moving object exists in the photographing scene, the mobile phone prompts the user with "A moving object exists within the current photographing range, and the slow shutter exposure mode is automatically entered" on the preview interface. As shown in (a) in FIG. 4, the preview interface may further include a slow shutter exposure control 401, used to indicate that the slow shutter exposure mode is currently entered. As shown in (b) in FIG. 4, the mobile phone may further prompt the user with "In this mode, you can obtain an image effect that a foreground subject is clear and a moving object in the background has a motion blur".

It should be noted that, in this embodiment of this application, the mobile phone may display information on a screen, or provide a related prompt for the user in another manner such as voice. A specific prompt manner is not limited in this embodiment of this application.

After entering the slow shutter exposure mode, the mobile phone displays, on the preview interface, a preview image in which a subject image is clear (that is, the subject image does not have a motion blur) and a background image has a motion blur, to present a function and a photographing effect of the slow shutter exposure mode to the user. The following describes the preview process.

After entering the slow shutter exposure mode, the mobile phone may determine a photographed subject. The subject may include one or more individual objects. The plurality of individual objects may belong to a same object type, or may belong to different object types. When the subject includes a plurality of individual objects, the plurality of individual objects usually keep relatively still, so that clear images of the plurality of individual objects in the subject can be simultaneously captured. In addition, the plurality of individual objects in the subject are usually located at a same depth of field, so that the plurality of individual objects can all be focused.

In some technical solutions, the mobile phone may automatically recognize a subject on a raw image. For example, the mobile phone may automatically recognize whether the raw image includes a preset type of object. If the raw image includes the preset type of object, the mobile phone determines that the subject is the preset type of object. For example, the preset type is a person, and the subject recognized by the mobile phone may be a person with a smallest depth of field on the raw image, or a person with a largest face on the raw image, or a middlemost person on the raw image, or a person at a golden section point on the raw image, or a plurality of persons with a same depth of field on the raw image, or all persons on the raw image. For example, the subject determined by the mobile phone is a plurality of persons that have a same depth of field and that keep relatively still on the raw image.

It should be noted that when the preset type is a person, in some technical solutions, the subject includes only a person. In some other technical solutions, the subject further includes an object overlapping with the person. For example, the subject includes a person and a mobile phone, a book, or a musical instrument held in a hand of the person.

For another example, the mobile phone may recognize the subject according to a preset sequence of object types. For example, the preset sequence of object types includes a person, an animal, and a doll. If the raw image includes a person, the mobile phone determines, in the manner described in the foregoing embodiment, that the subject is the person. If the raw image does not include a person but includes an animal, the mobile phone determines that the subject is the animal.

If the raw image does not include a person or an animal but includes a doll, the mobile phone determines that the subject is the doll.

For another example, the subject may be a photographed object that occupies a largest area on the raw image, or the subject may be a photographed object that is located in the middle or at a golden section point on the raw image. For another example, the subject may be a photographed object that is completely presented on the raw image. It should be noted that the subject may be of various object types, and is not limited to a person, an animal, a doll, a building, a plant, or the like.

In the foregoing embodiment, the mobile phone does not limit a depth of field of the subject. That is, the mobile phone automatically recognizes the subject within a full depth of field range. For example, the subject may be a person in a near foreground range (for example, there is a moving object behind the subject). For another example, the subject may be a person in a near foreground range (for example, there is a moving object (for example, a moving kitten or dog) in front of the subject). For another example, the subject may be a person in a distant background range (for example, the subject is a person opposite the road, and there are shuttle vehicles on the road in front of the subject). For another example, the subject may be a building in a distant background range (for example, there are shuttle people or vehicles in front of the building).

In some cases, a subject that the user is interested in may be close to a photographer and the camera, that is, the subject is located in a foreground range. Therefore, in some embodiments, the mobile phone may automatically recognize the subject in the foreground range whose depth of field is less than or equal to a preset depth of field, and an object in a background range whose depth of field is greater than the preset depth of field is an object in the background.

After recognizing the subject, the mobile phone may prompt the user with the subject. For example, the mobile phone may prompt the user with the subject by using subject prompt information such as a text or a subject box, or by using a voice. For example, as shown in (a) in FIG. 5, the mobile phone prompts, by using text information 501, the user that the person is the recognized subject. For another example, as shown in (h) in FIG. 5, the mobile phone selects a face or a body of the subject person by using a subject box 502, to prompt the user that the person is the subject.

Figure 6:
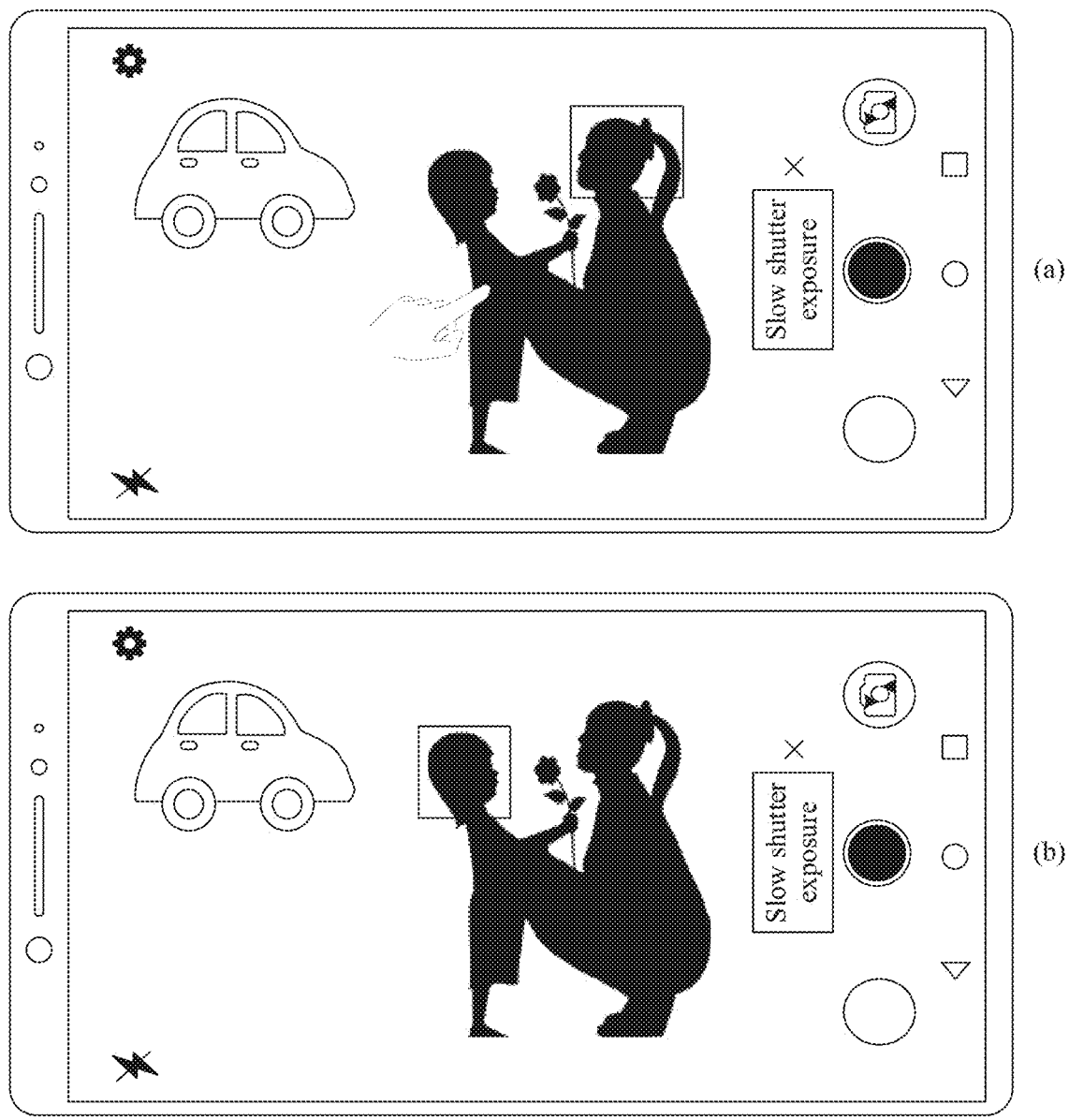
FIG. 6 is a schematic diagram of another group of interfaces according to an embodiment of this application.

In this embodiment of this application, the mobile phone may further determine the subject based on an indication operation of the user. For example, if the subject automatically recognized by the mobile phone is not a subject desired by the user, the mobile phone may change the subject based on the indication operation of the user. For example, as shown in (a) in FIG. 6, a subject in the subject box is a person 1, but the person 1 is not a subject desired by the user. After the mobile phone detects an operation of tapping a person 2 shown in (a) in FIG. 6 by the user, as shown in (b) in FIG. 6, the mobile phone determines that the subject is changed to the person 2, and displays the subject box on the person 2.

Figure 7:
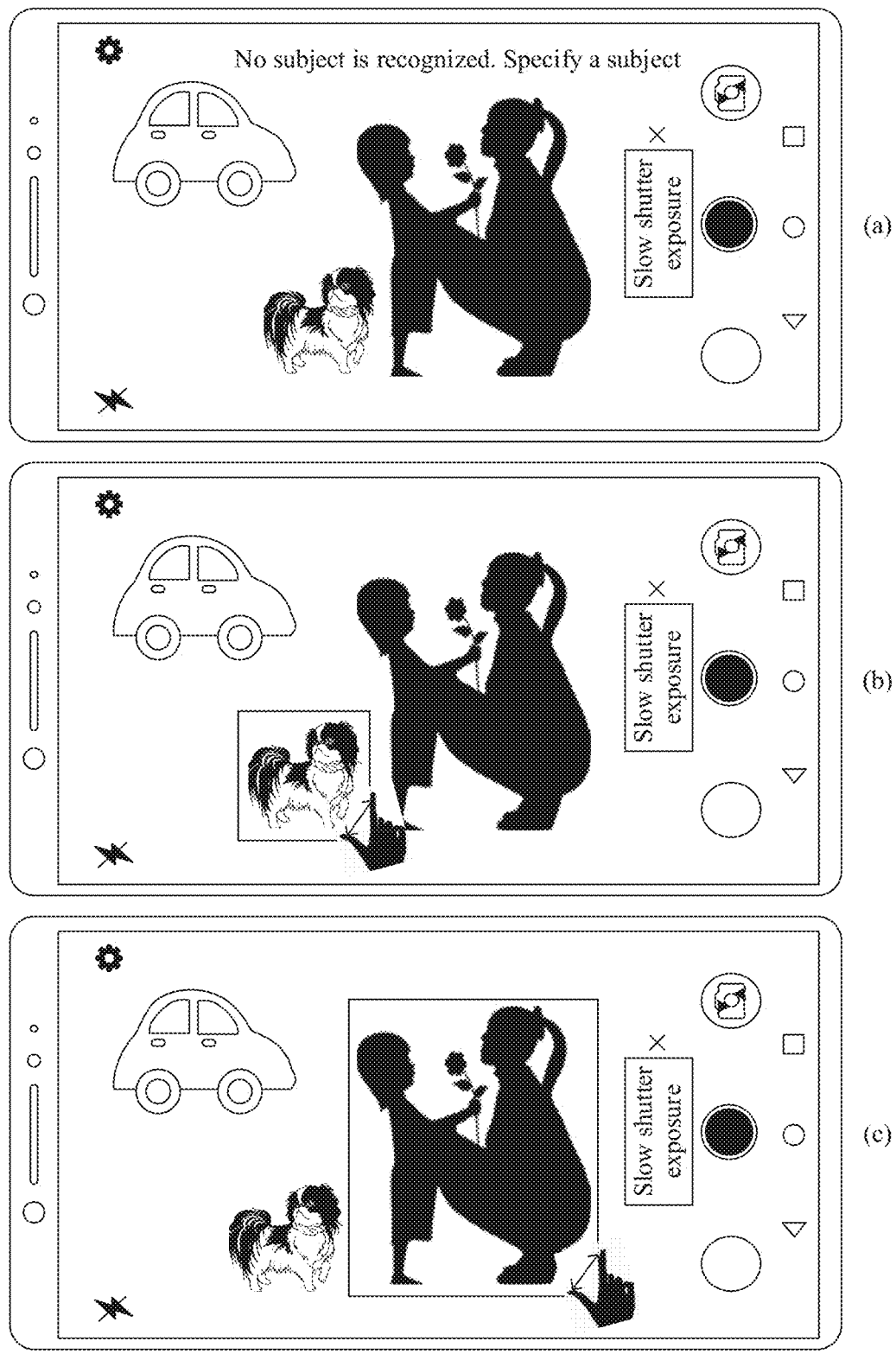
FIG. 7 is a schematic diagram of another group of interfaces according to an embodiment of this application.

For another example, the mobile phone fails to recognize the subject and prompts the user to specify the subject, and the mobile phone may determine the subject based on an indication operation of the user. For example, as shown in (a) in FIG. 7, the mobile phone prompts the user with "No subject is recognized. Specify a subject". A finger of the user touches the screen (the screen may be the touchscreen), and the mobile phone displays a subject box at a touch location of the finger on the preview interface. In response to a dragging operation of the user on the subject box, a location or a size of the subject box also changes accordingly, so that a subject selected by the user can be selected by using the subject box. For example, as shown in (b) in FIG. 7, the subject selected by the user is an animal. For another example, as shown in (c) in FIG. 7, the subject selected by the user is a person 1 and a person 2 that have a same depth of field and that are relatively still. If the subject selected by the user includes a plurality of persons with different depths of field, the mobile phone may prompt the user to select one or more persons with a same depth of field as the subject for focusing. For another example, the subject selected by the user is a person 1 and an animal that have a same depth of field.

In some technical solutions, on the preview interface, the mobile phone may continuously display subject prompt information, to continuously prompt the user with the subject, so that the user continuously learns of the subject determined by the mobile phone.

In this embodiment of this application, after entering the slow shutter exposure mode, the mobile phone continuously captures images by using the camera, and the ISP generates a raw image after processing the image captured by the camera. The mobile phone uses the camera to perform automatic exposure (automatic exposure, AE), and photographing parameters such as an exposure time, an ISO sensitivity or a capture frame rate when the camera captures an image are determined by the ISP based on a photographing environment.

The capture frame rate determined by the ISP is related to parameters such as ambient brightness. For example, a main policy for determining the photographing parameters when the ISP performs automatic exposure is as follows: Stronger incident ambient light of the camera indicates a shorter exposure time, a larger capture frame rate, and a lower ISO; and a weaker incident ambient light of the camera indicates a longer exposure time, a smaller capture frame rate, and a higher ISO. In addition, in the preview state, the exposure time is less than or equal to a preset value 3 (for example, 60 ms), and the ISO is less than or equal to a preset value 4 (for example, 6400). In addition, the capture frame rate is further related to a stability degree of the mobile phone (for example, the mobile phone is handheld or fixed on a tripod) and/or a moving speed of a moving object within the photographing range. For example, if the mobile phone is currently in a handheld mode, the exposure time is short to avoid a blurred image caused by handheld shaking when the exposure time is long, the capture frame rate is large, and the ISO is low. If the mobile phone is currently in a tripod fixed mode, the exposure time is long, the capture frame rate is small, and the ISO is high.

For example, for a correspondence between the photographing parameters of the camera and different photographing environments, refer to Table 1.

TABLE 1

| Photographing environment | | Exposure time (millisecond, ms) | Capture frame rate (frame/second, fps) | ISO |
|---|---|---|---|---|
| High ↓ | Outdoor-Direct sunlight | <1 | 30 | 50 |
|  | Indoor-Direct sunlight through windows | <1 | 30 | 50 |
|  | Outdoor-Tree shade from the sun | 10 | 30 | 50 |
|  | Outdoor-Building shade from the sun | 20 | 30 | 200 |
| Ambient brightness | Indoor-Light illumination | 20 | 30 | 200 |
|  | Night-Light | 30 | 30 | 500 |
|  | Indoor-No light illumination | 40 | 24 | 700 |
|  | Indoor-Darkroom | 60 | 16 | 5000 |
| Low | Night-Sky | 60 | 16 | 6400 |
|  | Night-No light | 60 | 16 | 6400 |

It can be learned from Table 1 that when brightness of the photographing environment changes from high to low, the exposure time increases, the corresponding capture frame rate decreases, and the ISO increases.

For example, in a photographing environment of daytime outdoor-direct sunlight, ambient brightness is high, the exposure time is less than 1 ms, the capture frame rate may be 30 fps, and the ISO may be 50. For example, in the photographing environment, a log of the mobile phone captured in a preview process is as follows:

Line 9739: 04-28 15:23:03.296 [72043.434265][I/AL-GO_CORE_AE] <hisi_ae_dump_expo_table, 2502>camera id: 0, basic_fi:33330, band_type 0, band_step:10000, fi range[33330, 62493], expo range [47, 62500], gain range[0x100, 0x8000]

Line 9748: 04-28 15:23:03.296 [72043.434387][I/FW] <ae_update_md_real_time,541>cam_id: 0, expo[225, 0x100], buffer: 0x95f8000, lum: 55, lv: 152, fps_range: 16, 30,flag: 0,capture:0

Line 9767: 04-28 15:23:03.296 [72043.435852][I/AL-GO_INT_MANAGER] <ai_thread_update_context, 1979>ae info: expo=131, gain=256, iso=50

Line 9774: 04-28 15:23:03.296 [72043.437530][I/AL-GO_INT_AWB] <ai_awb_update_ap_awb_input_info_realtime,3598>averagevalue, expo, gain, fps, brightness_lv: 46. 225, 256, 30, 152

Line 9819: 04-28 15:23:03.296 [72043.439514][I/AL-GO_CORE_AF] <af_trigger_get_tracking_enable 191>tracking_mode_enable: 1, pd_uc_status: 1, expo: 10, lv:152, face_luma:0, foreground:0

Line 10064: 04-28 15:23:03.328 [72043.467620][I/FW] <ae_update_md_real_time,541>0, expo[225, 0x100], buffer: 0x9708000, lum: 49, lv: 152, fps_range:16, 30,flag: 0,capture:0

Line 10088: 04-28 15:23:03.328 [72043.469665][I/AL-GO_CORE_AF] <af_trigger_get_tracking_enable, 191>tracking_mode_enable:1, pd_uc_status:1, expo:9, lv:152, face_luma:0, foreground:0

Line 10095: 04-28 15:23:03.328 [72043.469940][I/AL-GO_INT_MANAGER] <ai_thread_update context, 1979>ae info: expo=131, gain=256, iso=50

Herein, fps_range indicates the capture frame rate, expo in ae info indicates the exposure time (unit: microsecond (μs)), gain indicates an exposure gain, and iso indicates the sensitivity.

For example, in a photographing environment of night-sky, the ambient brightness is low, the exposure time may be 60 ms, the capture frame rate may be 16 fps, and the ISO may be 6400. Compared with the photographing environment of daytime outdoor-direct sunlight, the photographing environment of night-sky has lower ambient brightness, longer exposure time, smaller capture frame rate, and larger ISO. For example, in the photographing environment of night-sky, a log of the mobile phone captured in a preview process is as follows:

Line 19941: 04-28 20:46:00.166 [91420.211395][I/AL-GO_CORE_AE] <hisi_ae_dump_expo_table,2502>camera_id: 0, basic_fi:33330, band_type 0, band_step:10000, fi range[33330, 62493], expo range[47, 62500], gain range [0x100, 0x8000]

Line 19950: 04-28 20:46:00.166 [91420.2115171][I/FW] <ae_update_md_real_time,541>cam_id: 0, expo[30000, 0xdb2] buffer: 0x95f8000, 1 lv: −10, fps_range:16, 30,flag: 0,capture:0

Line 19964: 04-28 20:46:00.202 [91420.21289][I/AL-GO_INT_MANAGER] <ai_thread_update_context, 1979>ae info: expo=60000, gain=24272, iso=4740

Line 19985: 04-28 20:46:00.202 [91420.215484][I/AL-GO_INT_AWB], <ai_awb_update_ap_awb_input_info_realtime,3598>averagevalue, expo, gain, fps, brightness_lv: 1, 30000, 3506, 30, −10

Line 20030: 04-28 20:46:00.202 [91420.217468][I/AL-GO_CORE_AF] <af_trigger_get_tracking_enable, 191>tracking_mode_enable: 1, pd_uc_status: 1, expo: 1026000, lv:−10, face_luma:0, foreground:0

Line 20186: 04-28 20:46:00.226 [91420.244323][I/FW] <ae_update_md_real_time,541>cam_id: 0, expo [30000, 0xdb2], buffer: 0x9708000, lum: 1 lv: −10, fps_range:16, 30,flag: 0,capture:0

Line 20205: 04-28 20:46:00.226 [91420.246185][I/AL-GO_CORE_AF] <af_trigger_get_tracking_enable, 191>tracking_mode_enable: 1, pd_uc_status:1, expo: 369360, lv:−10, face_luma:0, foreground:0

Line 20211: 04-28 20:46:00.226 [91420.247070][I/AL-GO_INT_MANAGER] <ai_thread_update context, 1979>ae info: expo=60000, gain=24272, iso=4740

After entering the slow shutter exposure mode and before determining the subject, the mobile phone may display one or more frames of obtained raw images on the preview interface in real time. After determining the subject, the mobile phone performs image segmentation on each frame of raw image, to distinguish between a subject image in a region occupied by the subject and a background image in another region on the raw image. The image segmentation may also be referred to as subject segmentation or subject region segmentation. For example, the mobile phone may perform image segmentation by using an artificial intelligence AI algorithm. To improve segmentation precision of the subject, the mobile phone may improve recognition precision of a subject region with the help of an additional component, for example, a depth auxiliary such as a TOF depth camera, a binocular depth camera, or an infrared sensor.

When subject segmentation cannot be performed on a current raw image 1 due to reasons such as dark light, the mobile phone may prompt, on the preview interface, the user that brightness compensation needs to be performed on the subject, and may use a flash or the screen to compensate light to illuminate the subject. The mobile phone captures a raw image 2 after brightness compensation. The mobile phone may perform subject segmentation on the raw image 1 based on a brightness difference between the raw image 1 and the raw image 2.

Figure 5:
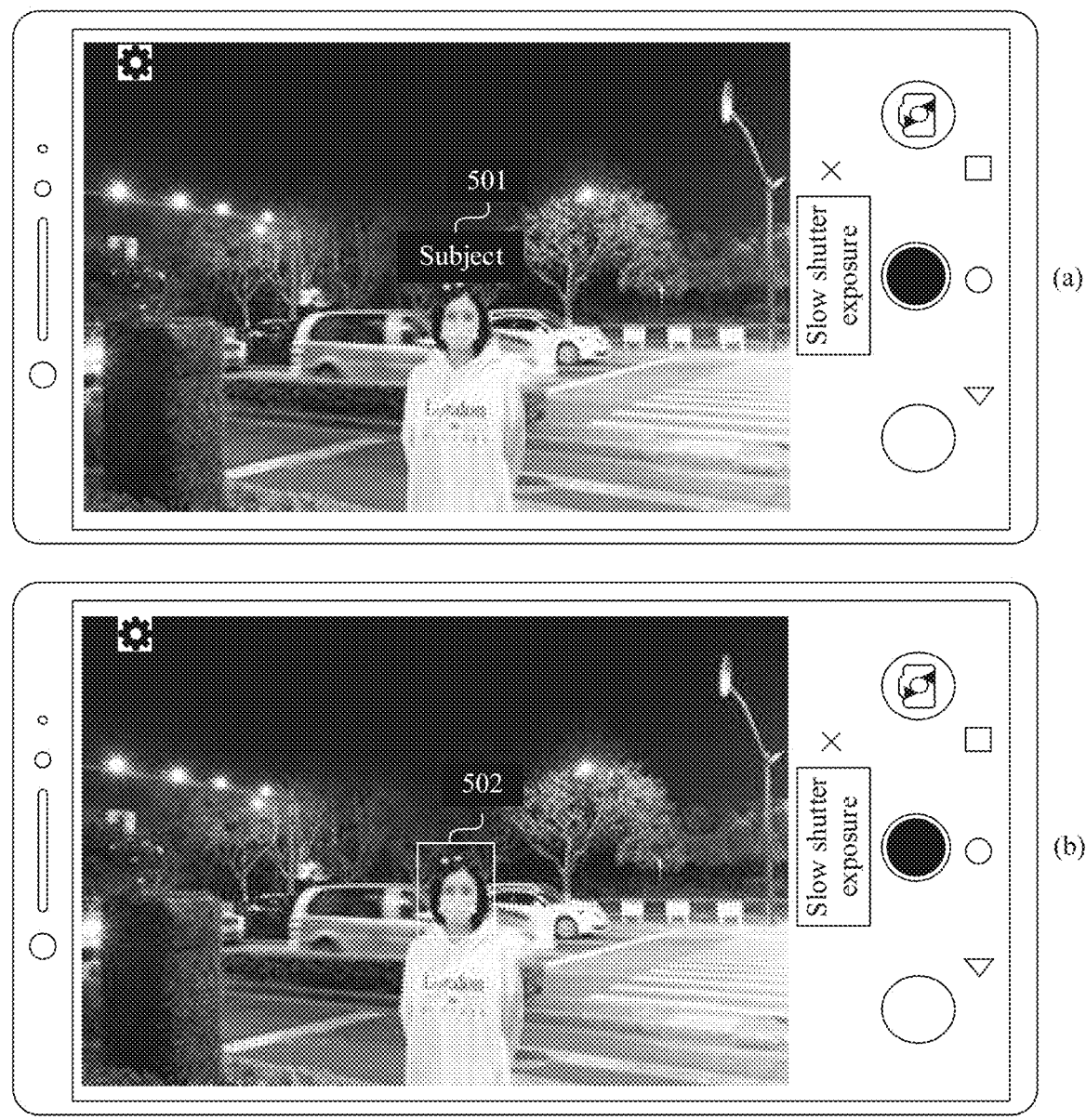
FIG. 5 is a schematic diagram of another group of interfaces according to an embodiment of this application.
Figure 8:
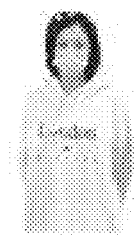
FIG. 8 is a schematic diagram of a group of image segmentation results according to an embodiment of this application.
Figure 8:

For example, in the scene shown in FIG. 5, for a subject image obtained by the mobile phone through segmentation, refer to (a) in FIG. 8, and for a background image obtained by the mobile phone through segmentation, refer to (b) in FIG. 8.

In some embodiments, after determining the subject in the preview state, the mobile phone processes, in N frames, the background image and the subject image that are obtained after segmentation, to generate a preview image, N is a preset value, for example, may be 3, 4, 5, or 10. The following describes a processing process of N frames of raw images.

For example, the mobile phone may register and overlay N frames of background images obtained by segmenting the N adjacent frames of raw images, to generate a preview background image. The mobile phone may further generate a preview subject image based on subject images obtained by segmenting the N frames of raw images. The mobile phone may fuse the preview background image and the preview subject image into the preview image, and display the preview image on the preview interface. For example, a plurality of methods such as edge gradient fusion or Poisson fusion may be used for the image fusion.

In the preview state in the slow shutter exposure mode, a display frame rate of the mobile phone for the preview image is a preset value, for example, may be 25 fps or 30 fps that is commonly used during preview, to provide a real-time and smooth preview effect for the user. It can be learned from the foregoing description that the photographing parameters such as the exposure time and the capture frame rate when the camera captures an image are controlled by the ISP based on the photographing environment. The exposure time changes in real time, the capture frame rate is a fixed value (for example, 30 fps) set by the ISP based on the current photographing environment, and the capture frame rate is usually greater than or equal to the display frame rate. In the preview process, the mobile phone may overlay N different adjacent frames of background images in a manner of a sliding window with a length of N based on a quantity of raw images obtained in real time in a unit time and the display frame rate. That is, adjacent groups of N frames of raw images are slid in the sliding window manner.

For example, it is assumed that N is 4, the display frame rate is 30 fps, and the capture frame rate is also 30 fps. After determining the subject, the mobile phone obtains a raw image 1, and displays the raw image 1 on the preview interface. After obtaining a raw image 2, the mobile phone displays the raw image 2 on the preview interface. After obtaining a raw image 3, the mobile phone displays the raw image 3 on the preview interface. After obtaining the raw image 4, the mobile phone has obtained four adjacent frames of raw images, and registers and overlays background images 1 to 4 of the adjacent raw images 1 to 4, to generate a preview background image. The mobile phone obtains a preview subject image based on subject images 1 to 4 of the raw images 1 to 4. The mobile phone fuses the preview background image and the preview subject image to generate a preview image, and displays the preview image on the preview interface. Then, after obtaining a raw image 5, the mobile phone registers and overlays background images 2 to 5 of the adjacent raw images 2 to 5, to generate a preview background image. The mobile phone obtains a preview subject image based on subject images 2 to 5 of the raw images 2 to 5. The mobile phone fuses the preview background image and the preview subject image to generate a preview image, and displays the preview image on the preview interface. Subsequently, the mobile phone continues to process four adjacent frames of raw images in the sliding window manner, to generate and display a preview image.

For another example, it is assumed that N is 4; the display frame rate is 25 fps, that is, the mobile phone displays one frame of preview image on the preview interface every 0.04 s; and the capture frame rate is 30 fps, that is, the mobile phone captures one frame of image every $\frac{1}{30}$ s. After determining the subject, the mobile phone obtains a raw image 1 within $\frac{1}{30}$ s (that is, 0.0333 s), and displays the raw image 1 on the preview interface within 0.04 s. Then, the mobile phone obtains a raw image 2 within $\frac{1}{30}$ s to $\frac{2}{30}$ s (that is, 0.0666 s), and displays the raw image 2 on the preview interface within 0.08 s. The mobile phone obtains a raw image 3 within $\frac{2}{30}$ s to $\frac{3}{30}$ s (that is, 0.1 s), and displays the raw image 3 on the preview interface within 0.12 s. The mobile phone obtains a raw image 4 within $\frac{3}{30}$ s to $\frac{4}{30}$ s (that is, 0.1333 s), and the mobile phone registers and overlays background images 1 to 4 of the raw images 1 to 4, to generate a preview background image. The mobile phone obtains a preview subject image based on subject images 1 to 4 of the raw images 1 to 4. The mobile phone fuses the preview background image and the preview subject image to generate a preview image, and displays the preview image on the preview interface within 0.16 s. Then, the mobile phone obtains a raw image 5 within $\frac{4}{30}$ s to $\frac{5}{30}$ s (that is, 0.1666 s), and obtains a raw image 6 within $\frac{6}{30}$ s (that is, 0.2 s). In a technical solution, the mobile phone registers and overlays background images 2 to 5 of the raw images 2 to 5, to generate a preview background image. The mobile phone obtains a preview subject image based on subject images 2 to 5 of the raw images 2 to 5. The mobile phone fuses the preview background image and the preview subject image to generate a preview image, and displays the preview image on the preview interface within 0.2 s. The raw image 6 is overlaid in a next sliding window. In another technical solution, the mobile phone registers and overlays background images 3 to 6 of the raw images 3 to 6, to generate a preview background image. The mobile phone obtains a preview subject image based on subject images 3 to 6 of the raw images 3 to 6. The mobile phone fuses the preview background image and the preview subject image to generate a preview image, and displays the preview image on the preview interface, Subsequently, the mobile phone continues to process four adjacent frames of raw images in the sliding window manner, to generate and display a preview image.

In the foregoing embodiment, the mobile phone performs processing such as image segmentation and overlay on the obtained raw image only after determining the subject. In some other embodiments, the mobile phone may store a raw image that is captured after the mobile phone enters the slow shutter exposure mode and before the mobile phone determines the subject. After determining the subject, the mobile phone may perform processing such as image segmentation and overlay on N adjacent frames of raw images that are captured before the subject is determined, to generate a preview image, and display the preview image on the preview interface. Subsequently, after obtaining a new raw image, the mobile phone processes N adjacent frames of raw images in the sliding window manner, to generate and display a preview image.

For example, N is 4, and N adjacent frames of background images include a background image a, a background image b, a background image c, and a background image d. A process in which the mobile phone registers and overlays the N frames of background images may include: The mobile phone separately registers the background image h, the background image c, and the background image d with the background image a, to obtain a background image b, a background image c', and a background image d'. In some technical solutions, the mobile phone overlays the background image b', the background image c', the background image d', and the background image a, to generate a preview background image a. In some other technical solutions, the mobile phone overlays the background image b' and the background image a, overlays an overlay result and the background image c', and then overlays an overlay result in this case and the background image d', to generate a preview background image a.

The mobile phone may obtain a preview subject image based on N frames of subject images in a plurality of manners. In some technical solutions, the mobile phone selects, from the N frames of subject images, one frame of subject image as the preview subject image. For example, the preview subject image may be a subject image with highest brightness (for example, a maximum sharpness value) in the N frames of subject images. Alternatively, the preview subject image may be a latest or first captured frame of subject image in the N frames of subject images. Alternatively, the preview subject image may be a middlemost frame of subject image or a frame of subject image close to the middle in the N frames of subject images. For example, N is 3, and the preview subject image is the second frame of subject image in the three frames of subject images. For another example, N is 4, and the preview subject image is the second or third frame of subject image in the tour frames of subject images. In some other technical solutions, the mobile phone registers and overlays M adjacent frames of subject images in the N frames of subject image, to generate the preview subject image, M≤N. The M frames of subject images include one frame of subject image with highest brightness in the N frames of raw images, and capture duration of M frames of raw images is less than preset duration T1. The preset duration T1 is an empirical value, for example, may be 1 s (second). Within the duration T1, there is a high probability that a subject such as a person or an animal does not shake (or sway).

Figure 9:
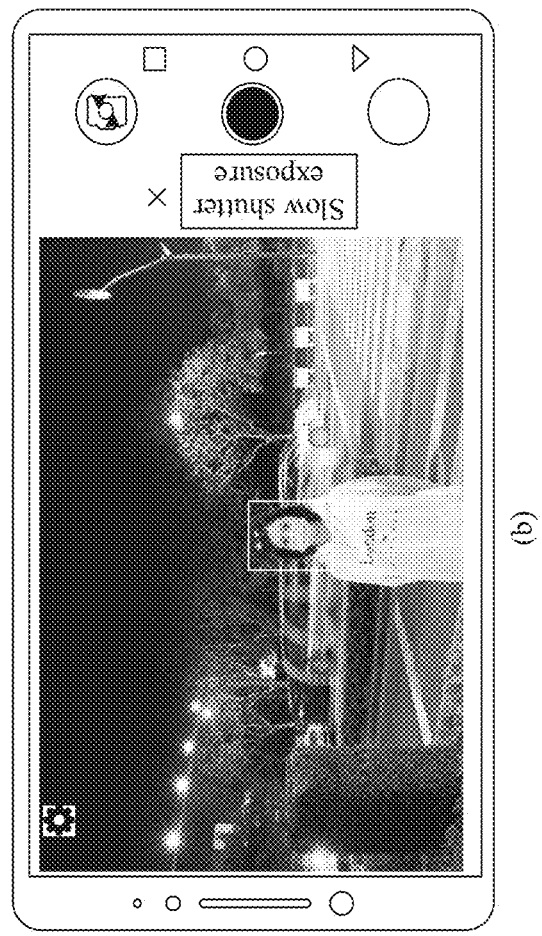
FIG. 9 is a schematic diagram of a group of a preview background image and a preview image according to an embodiment of this application.
Figure 9:

For example, in the case shown in FIG. 5, for the preview background image, refer to (a) in FIG. 9, where a moving vehicle has a motion blur. For the preview image displayed by the mobile phone on the preview interface, refer to (h) in FIG. 9, where the preview image includes a clear subject image and a background image with a motion blur.

For another example, in a scene in which the subject is a person opposite to the road and there are vehicles on the road, an image of the subject person is clear and has no motion blur, and vehicles in front of the subject person has a motion blur on a preview image presented on the preview interface.

For another example, in a scene in which the subject is a building behind a people flow, an image of the subject building is clear and has no motion blur, and the people flow in front of the subject building has a motion blur on a preview image presented on the preview interface.

In this way, an image effect that the subject image is clear and the background image has a motion blur may be displayed on the preview interface, so that the user intuitively sees, in the preview state, an effect that can be obtained through photographing in the slow shutter exposure mode.

A background image part on the preview image displayed on the preview interface is the preview background image, that is, an image obtained after the N frames of background images are registered and overlaid. For a moving object in the preview background image, registration and overlay of the background images cause a motion blur of the moving object. For a still object in the preview background image, an image obtained through registration and overlay is brighter and clearer. In this way, the user can see, on the preview interface, the background image in which the static object is clear and the moving object has a motion blur.

In addition, when the preview subject image is a subject image with highest brightness (for example, a maximum sharpness value) in the N frames of subject images, brightness of the subject image on the preview image may be higher. When the preview subject image is a recently captured frame of subject image in the N frames of subject images, the mobile phone may present a current state of the subject to the user on the preview interface in real time. When the preview subject image is a middlemost frame of subject image or a frame of subject image close to the middle in the N frames of subject images, a quantity of frames between adjacent preview subject images is not much different, so that obvious jump or frame freezing between subject images on the preview images can be avoided as much as possible.

In the foregoing embodiment of this application, in the preview state, the mobile phone separately processes the subject image and the background image that are obtained after the raw image is segmented. Therefore, when the background images are overlaid to form a motion blur of a moving object, the subject image on the raw image is not overlaid at the same time, and the subject image has no motion blur. Therefore, in the preview state, when obtaining the preview background image with a motion blur, the mobile phone can also obtain the clear preview subject image.

In some embodiments, in the preview process, the user may further indicate to modify (for example, add, delete, or replace) the subject. For example, the user may drag the subject box to change a position or a size of the subject box, and an object in the subject box is a modified subject. After recognizing the new subject in the subject box, the mobile phone segments, in the manner described in the foregoing embodiment, a raw image subsequently obtained by the camera based on the modified subject, separately processes a subject image and a background image that are obtained after segmentation, and then fuses a preview subject image and a preview background image that are obtained through the processing, to display, on the preview interface, a preview image in which a subject image is clear and a background image has a motion blur.

In some other embodiments of this application, in the preview state after entering the slow shutter exposure mode, the mobile phone may not obtain the subject image and the background image through segmentation, but register and overlay the N adjacent frames of raw images, to generate and display a preview image in which a moving object has a motion blur.

In some other embodiments of this application, in the preview state after entering the slow shutter exposure mode, the mobile phone may not obtain the subject image and the background image through segmentation, but perform registration and cumulative overlay on the raw images, to generate a preview image in which a moving object has a motion blur. In this case, when the subject shakes, the subject image on the preview interface may also have a motion blur.

Figure 10:
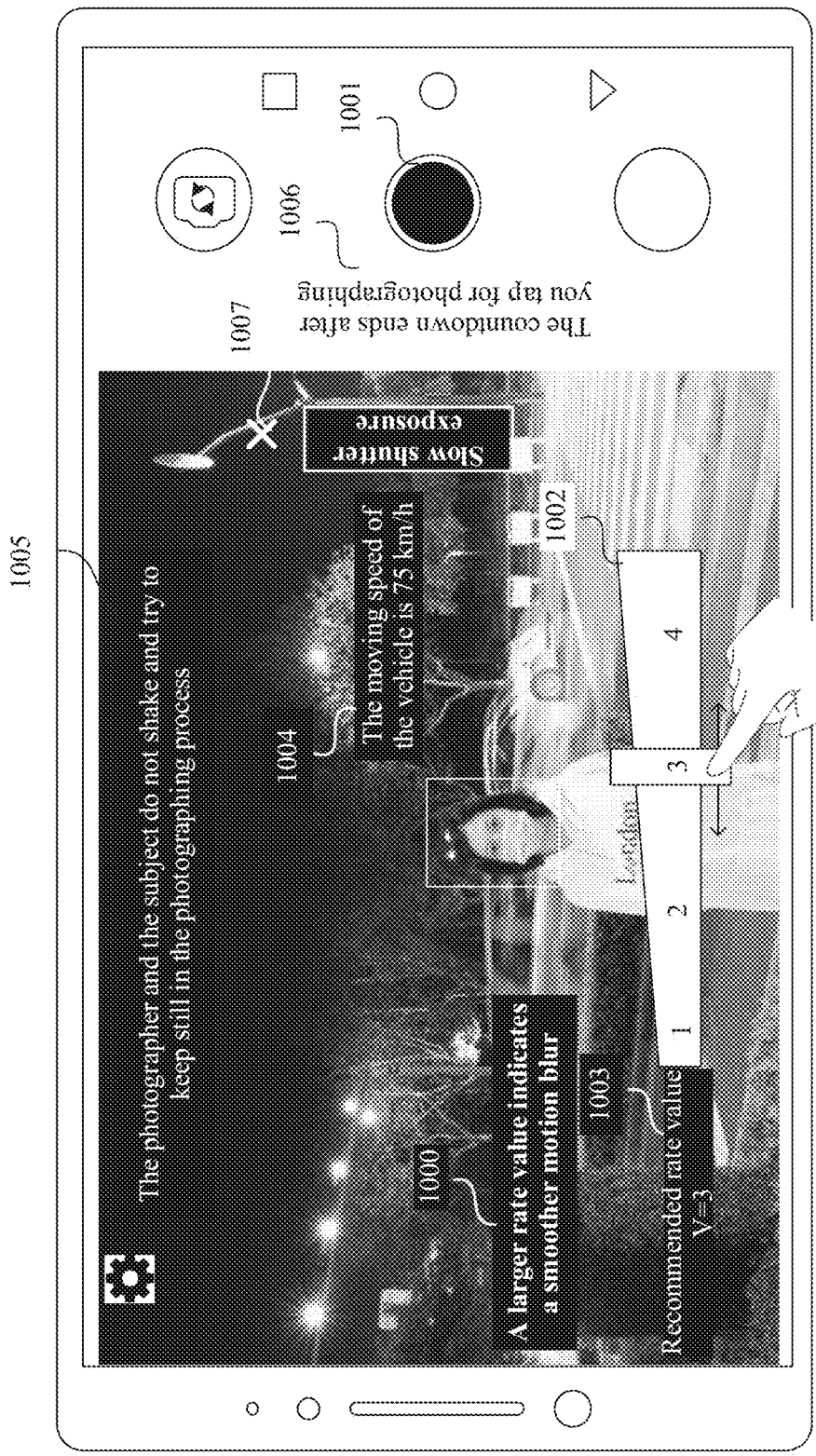
FIG. 10 is a schematic diagram of an interface according to an embodiment of this application.

In addition, in this embodiment of this application, in the preview state, as shown in FIG. 10, the preview interface may include a photographing control 1001. After detecting a photographing operation of tapping the photographing control 1001 by the user, the mobile phone starts, in the slow shutter exposure mode, to take a photo in which a subject image is clear and a background image has a motion blur.

In addition, the preview interface may further include a rate control, configured to control a quantity of frames captured in a photographing process and a quantity of overlaid frames of background images in the slow shutter exposure mode. For example, the rate control may be a rate bar (bar) 1002 shown in FIG. 10. The user may drag the rate bar 1002 to control a rate value, that is, control a quantity of overlaid frames of background images after photographing starts. The rate value may also be referred to as a bar value.

In some embodiments, the preview interface may further include a recommended rate value 1003. The recommended rate value 1003 is determined based on a factor such as a type or a moving speed of a moving object in the background image. The mobile phone can obtain a good photographing effect based on a quantity of overlaid frames corresponding to the recommended rate value 1003. For example, a higher speed of a moving object indicates a larger recommended rate value. For example, the recommended rate value 1003 shown in FIG. 10 is V=3.

The mobile phone uses by default the recommended rate value for photographing. Alternatively, the user may drag the control bar to change the rate value. When the rate value is smaller, fewer frames are captured after the photographing starts, fewer frames of background images are overlaid, and a motion blur of a moving object in the background is weaker. When the rate value is larger, more frames are captured after the photographing starts, more frames of background images are overlaid, a motion blur of a moving object in the background is stronger, and a motion blur of the background image is smoother. Therefore, the rate value may also be referred to as a motion blur adjustment value. For example, when the motion blur adjustment values on the rate bar are V=1, 2, 3, and 4, the corresponding quantities of overlaid frames of background images after the photographing starts are K=10*V=10, 20, 30, and 40. As shown in FIG. 10, the mobile phone may further display prompt information 1000 on the preview interface: A larger motion blur adjustment value indicates a smoother motion blur.

In some embodiments, the motion blur adjustment value is further associated with N the preview state. For example, a larger motion blur adjustment value indicates a larger quantity N of overlaid frames of background images in the preview state, and a longer motion blur of a moving object in the preview image. A smaller motion blur adjustment value indicates a smaller quantity N of overlaid frames of background images in the preview state, and a shorter motion blur of a moving object in the preview image. The mobile phone may generate and display preview images with different motion blur lengths based on the motion blur adjustment value.

In some technical solutions, the preview interface may further include speed prompt information, used to prompt the user with a speed of a moving object in the photographing scene. The speed may be determined when the mobile phone recognizes the slow shutter photographing scene. For example, as shown in FIG. 10, the mobile phone may display speed prompt information 1004 on the preview interface: The moving speed of the vehicle is 75 km/h.

In some technical solutions, as shown in FIG. 10, the preview interface may further include prompt information 1005, used to prompt the user with "The photographer and the photographed subject do not shake and try to keep still in the photographing process".

In some technical solutions, the preview interface further includes countdown prompt information, so that the user learns in advance that a countdown is performed after the photographing starts, and the photographing process takes a specific time. For example, as shown in FIG. 10, countdown prompt information 1006 is used to prompt the user with "The countdown ends after you tap for photographing".

In some technical solutions, the preview interface may further include foreground compensation prompt information, to prompt the user to perform compensation when brightness of the foreground subject is insufficient.

In addition, in the preview state, if the user does not want to take a photo in which a subject image is clear and a background image has a motion blur, the user may indicate the mobile phone to exit the slow shutter exposure mode. For example, after detecting an operation of tapping a cross control 1007 shown in FIG. 10 by the user, the mobile phone may exit the slow shutter exposure mode, and display the preview interface in the photo mode shown in FIG. 3(*b*). The mobile phone may further exit the slow shutter exposure mode in response to an operation such as a voice instruction or a shortcut gesture of the user. An operation of triggering the mobile phone to exit the slow shutter exposure mode is not limited in this embodiment of this application.

The foregoing embodiment is described by using an example in which after entering the photographing mode, the mobile phone detects, based on the raw image, that a moving object exists in the photographing range, that is, determines that the current scene is the slow shutter photographing scene. In some other embodiments, after entering the photo mode, the mobile phone may determine, after detecting that a moving object exists in the photographing range and recognize the subject, that the current scene is the slow shutter photographing scene.

In some other embodiments, to clearly photograph the subject, the subject is usually close to the camera. Therefore, after entering the photo mode, the mobile phone detects, within a range whose depth of field is greater than the preset depth of field, that a moving object exists in the photographing range, and determines, after recognizing the subject in a range whose depth of field is less than or equal to the preset depth of field, that the current scene is the slow shutter photographing scene.
Solution 2:

in some other embodiments, after entering the photo mode, the mobile phone recognizes whether a current scene is a slow shutter photographing scene. If the current scene is the slow shutter photographing scene, the mobile phone prompts the user whether to enter the slow shutter exposure mode. The mobile phone enters the slow shutter exposure mode only after detecting an operation that the user indicates to enter the slow shutter exposure mode.

Figure 11:
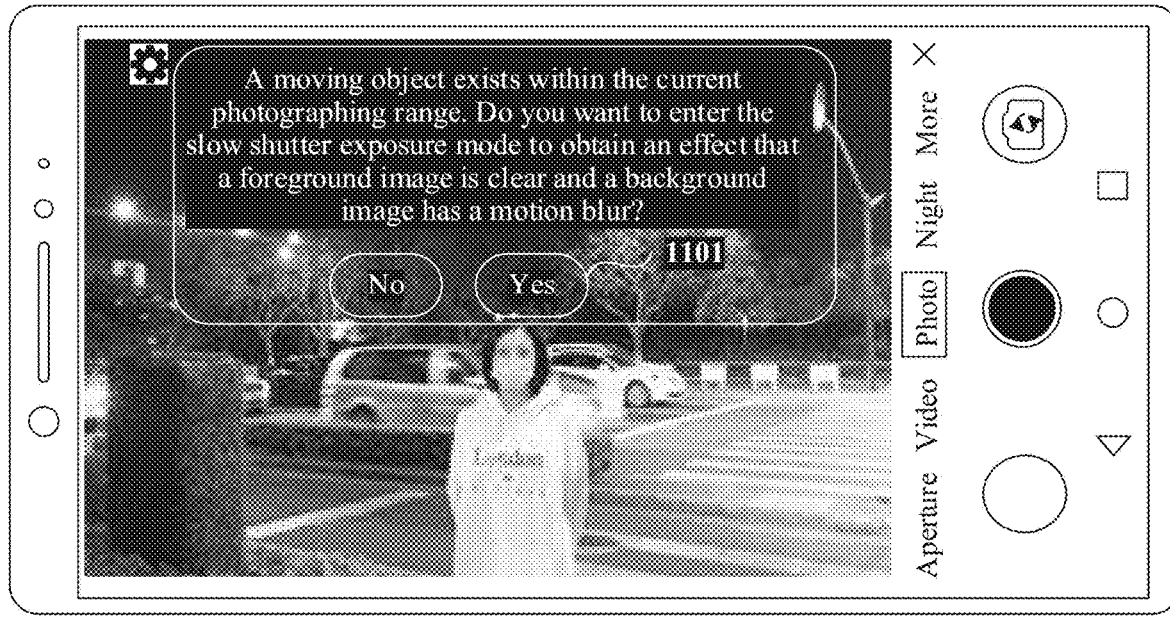
FIG. 11 is a schematic diagram of another interface according to an embodiment of this application.
Figure 12:
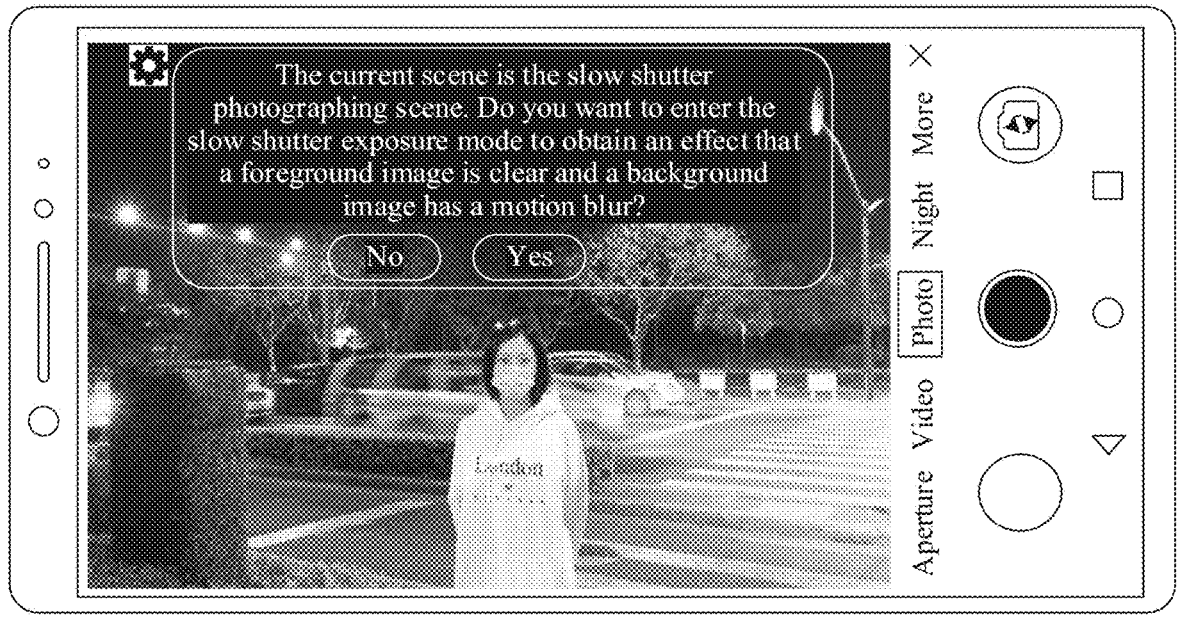
FIG. 12 is a schematic diagram of another interface according to an embodiment of this application.

For example, as shown in FIG. 11, the mobile phone may prompt the user with "A moving object exists within the current photographing range. Do you want to enter the slow shutter exposure mode to obtain an effect that a subject image is clear and a background image has a motion blur?". Alternatively, the mobile phone may prompt the user with "There are moving vehicles in the current photographing scene. Do you want to enter the slow shutter exposure mode? In the slow shutter exposure mode, you can obtain an effect that a subject image is clear and vehicles have a motion blur in the background". After detecting an operation of tapping a "Yes" control by the user, the mobile phone enters the slow shutter exposure mode. After entering the slow shutter exposure mode, the mobile phone displays, on the preview interface, a preview image in which a subject image is clear and a background image has a motion blur, to present a function and a photographing effect of the slow shutter exposure mode to the user.
Solution 3:

In some other technical solutions, after entering the photo mode, the mobile phone recognizes whether a current scene is a slow shutter photographing scene. As shown in FIG. 12, if the current scene is the slow shutter photographing scene, the mobile phone displays, on the preview interface, a preview image in which a subject image is clear and a background image has a motion blur, and prompts the user whether to enter the slow shutter exposure mode. The mobile phone enters the slow shutter exposure mode only after detecting an operation that the user indicates to enter the slow shutter exposure mode, and continues to display, on the preview interface, the preview image in which the subject image is clear and the background image has a motion blur, to present a function and a photographing effect of the slow shutter exposure mode to the user.

In the foregoing embodiment, after the mobile phone enters the slow shutter exposure mode, the preview image in which the subject image is clear and the background image has a motion blur is displayed on the preview interface. In some other embodiments, after the mobile phone enters the slow shutter exposure mode, the mobile phone does not display, on the preview interface, the preview image in which the subject image is clear and the background image has a motion blur. Instead, the mobile phone displays a raw image on the preview interface in real time, which is the same as that in the normal photo mode. Only after photographing starts, the mobile phone displays, on a photographing interface, an image effect that the subject image is clear and the background image gradually generates a motion blur.
Solution 4:

In some other technical solutions, after the mobile phone enters the photo mode, if the mobile phone detects an operation that the user indicates to enter the slow shutter exposure mode, the mobile phone enters the mode. For example, after entering the photo mode, a slow shutter exposure control is displayed on the preview interface. After detecting an operation of tapping the slow shutter exposure control by the user, the mobile phone enters the slow shutter exposure mode.

After the mobile phone enters the slow shutter exposure mode, if a current scene is a slow shutter photographing scene, the mobile phone displays, on the preview interface, a preview image in which a subject image is clear and a background image has a motion blur. If the current scene is not the slow shutter photographing scene, the mobile phone displays a generated raw image on the preview interface, and prompts the user that no moving object is detected currently, and a photo with a motion blur effect cannot be generated. In addition, the mobile phone may further prompt the user whether to continue to use the slow shutter photographing mode. The mobile phone continues to stay in the slow shutter exposure mode or exits the slow shutter exposure mode based on an indication of the user.

203: After detecting a photographing operation of the user, the mobile phone starts photographing, and displays, on a photographing interface, a process in which a subject image is clear and a background image gradually generates a motion blur.

Figure 13:
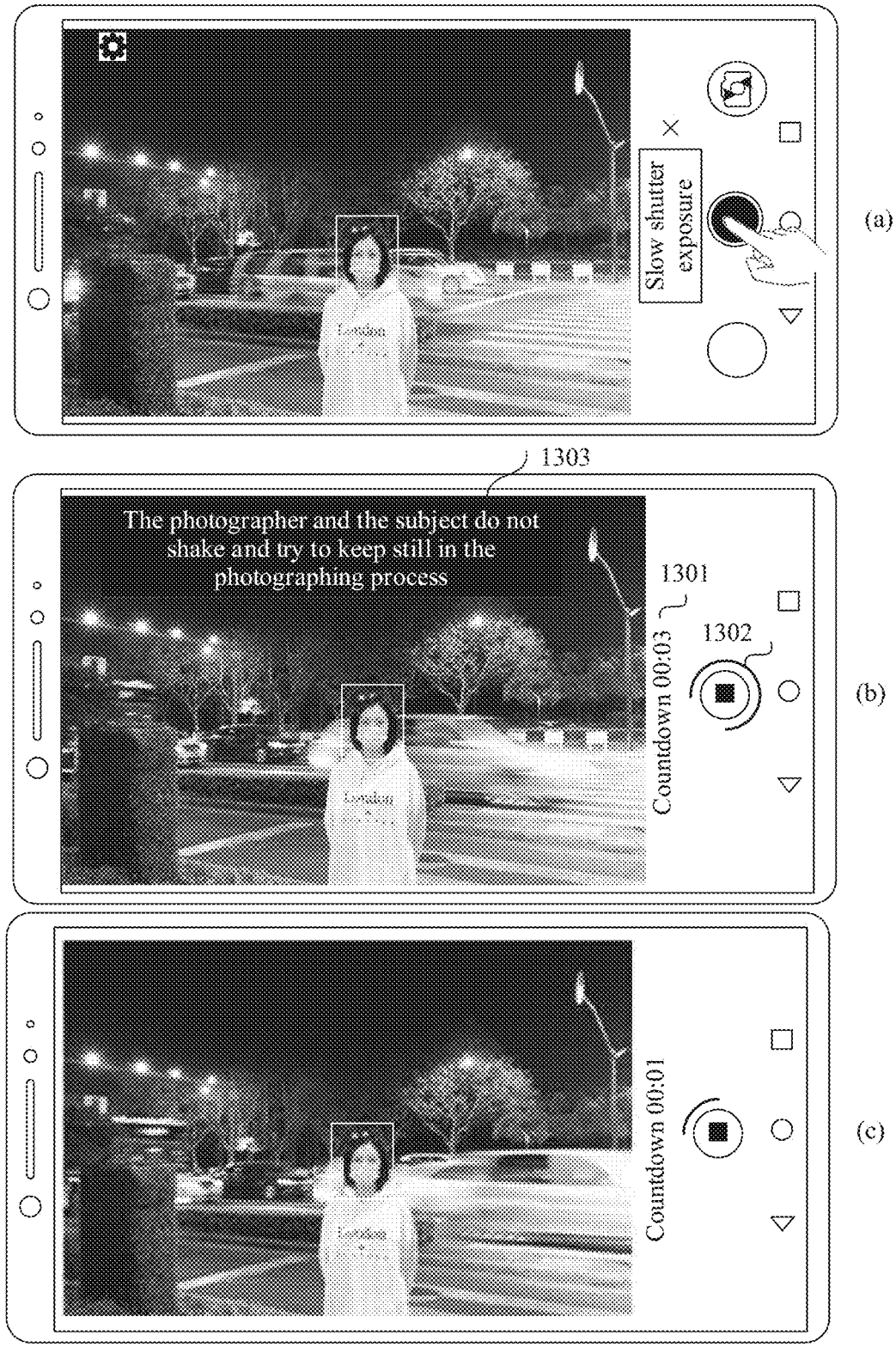
FIG. 13 is a schematic diagram of another group of interfaces according to an embodiment of this application.

For example, as shown in (a) in FIG. 13, after detecting an operation of tapping a photographing control by the user, the mobile phone starts photographing, and displays the photographing interface. An image displayed on the photographing interface may be referred to as an intermediate image or a captured image. It should be noted that the mobile phone may further perform photographing in response to an operation such as a voice instruction or a shortcut gesture of the user. An operation of triggering the mobile phone to perform photographing is not limited in this embodiment of this application.

In this embodiment of this application, the photographing interface includes countdown prompt information and a countdown control, to prompt the user with remaining photographing duration, Countdown photographing duration may be duration in which the mobile phone completes capture of a raw image frame, or duration in which the mobile phone completes capture of a raw image frame and processing and generation of a target image. After the mobile phone detects the photographing operation of the user, the countdown prompt information and the countdown control shows a countdown of photographing duration T2. For example, T2 may be 3 s, 4 s, or 5 s. The countdown prompt information is a time value updated in real time in the photographing process, and indicates current real-time remaining photographing duration. For example, as shown in (b) in FIG. 13 countdown prompt information 1301 on the photographing interface displays "Countdown 00:03", and is updated every second, and a countdown control 1302 just completes a full circle after the countdown ends.

The countdown photographing duration T2 is less than or equal to a preset value T0. In the photographing process, if the subject shakes (or sways), an image captured by the mobile phone is likely to be blurred. However, the subject such as a person or an animal is prone to shake (or sway) in the photographing process, and cannot maintain a posture for a long time. Therefore, photographing difficulty is increased. The mobile phone presets maximum photographing duration T0 used for imaging of the subject, and the maximum photographing duration T0 is longest duration in which the subject can tolerate being still. After the countdown T2 ends, the mobile phone ends the photographing process and takes a photo. In the countdown photographing duration T2, the mobile phone may compose a plurality of image frames within a short exposure time Ts, to obtain an image with less shake and less blur.

In some technical solutions, the countdown photographing duration T2 is a fixed value.

In some other technical solutions, the countdown photographing duration T2 is related to one or more of factors such as a speed (a highest speed, an average speed, or the like when there are a plurality of moving objects) of a moving object in the photographing range, a motion blur adjustment value, or a capture frame rate (related to exposure time) determined by the ISP in real time based on the current photographing environment. The countdown photographing duration T2 is positively correlated with a quantity of captured frames. To be specific, a larger quantity of captured frames indicates longer countdown photographing duration T2, and a smaller quantity of captured frames indicates shorter countdown photographing duration T2.

For example, in a same photographing environment (for example, there is outdoor direct sunlight in daytime, and illuminance is 200 lux (lux, lx)), motion blur adjustment values are the same, and the user holds the mobile phone to separately photograph a same photographing range (for example, the photographing range shown in FIG. 5) twice. If the moving speeds of the moving object in the background in the two times of photographing are different, the two countdown photographing durations T2 are different. For example, if a speed of the moving object is lower, longer photographing duration is required to capture more frames to form a longer motion blur. Accordingly, T2 is larger. If a speed of the moving object is higher, fewer frames are captured. Accordingly, T2 is smaller.

For another example, in a same photographing environment (for example, there is light at night, and illuminance is 0.2 lx), after the mobile phone is fixed on a tripod, the mobile phone separately photographs a same photographing range (for example, the photographing range shown in FIG. 5) twice. If speeds of the moving object in the background are the same in the two photographing processes, but motion blur adjustment values set for the two times of photographing are different, the two countdown photographing durations T2 are also different. For example, if a motion blur adjustment value is larger, more frames of background images need to be overlaid, more raw images need to be obtained, and more image frames need to be captured. Accordingly, T2 is larger. If a motion blur adjustment value is smaller, fewer frames of background images need to be overlaid, fewer raw images need to be obtained, and fewer image frames need to be captured. Accordingly, T2 is smaller.

For another example, the mobile phone photographs a same photographing range (for example, the photographing range shown in FIG. 5) twice. If the motion blur adjustment values set for the two times of photographing are the same, but photographing environments of the two times of photographing are different (for example, photographing is separately performed in an environment with higher brightness in daytime and an environment with lower brightness at night), capture frame rates determined by the ISP based on the current photographing environments in the two times of photographing are also different, and two countdown photographing durations T2 are also different. For example, when brightness at night is low, an exposure time needs to be prolonged to improve image brightness. Therefore, a capture frame rate decreases, and longer photographing duration is required to capture a same quantity of image frames. Therefore, T2 is larger. On the contrary, when brightness in daytime is high, an exposure time may be reduced. When a capture frame rate is larger and a quantity of capture frames is the same, T2 is accordingly reduced.

In an implementation, countdown photographing duration is T2=V*W1*W2*W3. V is used to represent the motion blur adjustment value. W1 is a weight of the motion blur adjustment value, which may be, for example, 1.2. W2 is a weight of the speed of the moving object. For example, weights corresponding to different intervals in ascending order of the optical flow motion vector are successively 1.0, 0.9, 0.8, and 0.7. W3 is a weight of the capture frame rate (dynamic) determined by the ISP, for example, may be 30/capture frame rate.

In some other embodiments, the countdown photographing duration T2 is further related to another factor such as the subject. For example, when the subject is an adult, the subject may keep still for a longer time, and T2 may be larger. When the subject is a child, the subject may keep still for a shorter time, and T2 may be smaller.

In some implementations, after detecting the photographing operation of the user, the mobile phone may determine the countdown photographing duration T2 based on the foregoing related factors, and start countdown from T2.

In some other implementations, the mobile phone may determine the countdown photographing duration T2 in real time based on the foregoing related factors in the preview state, and prompt the user with the countdown photographing duration T2 on the preview interface, so that the user learns of duration of the photographing process in advance. For example, when illumination is 300 lx in daytime, the moving speed of the vehicle is 75 km/h, and the motion blur adjustment value is V=3, the mobile phone may prompt the user on the preview interface that the countdown photographing duration is 2 s. When illumination is 300 lx in daytime, the moving speed of the vehicle is 60 km/h, and the motion blur adjustment value is V=3, the mobile phone may prompt the user on the preview interface that the countdown photographing duration is 3 s.

In some technical solutions, as shown in (b) in FIG. 13, the mobile phone may continuously display the subject box on the photographing interface, to continuously prompt the user with the subject in the photographing process.

In some other technical solutions, as shown in (b) in FIG. 13, the photographing interface further includes prompt information 1303, used to prompt the user with "The photographer and the photographed subject do not shake and try to keep still in the photographing process", or prompt the photographer to use a tripod to perform photographing.

In this embodiment of this application, after detecting the photographing operation of the user, the mobile phone continuously captures images by using the camera, and obtains a raw image after the ISP processes the image captured by the camera, Photographing parameters such as an exposure time, an ISO sensitivity, or a capture frame rate when the camera captures an image are determined by the ISP based on a photographing environment. In addition, the capture frame rate determined by the ISP is related to a parameter such as ambient brightness. For example, higher ambient brightness indicates stronger incident ambient light of the camera, a shorter exposure time, a larger capture frame rate, and a lower ISO. Lower ambient brightness indicates weaker incident ambient light of the camera, a longer exposure time, a smaller capture frame rate, and a higher ISO.

Similar to that in the preview state, in the photographing process, a correspondence between the photographing parameters of the camera and different photographing environments is consistent with that in the preview state. For example, for the correspondence, refer to Table 1. Different from the preview state, in the photographing process, if darkness is very low in a current photographing environment such as an environment of night—the sky or an environment of night—no light, an exposure time and an ISO may be greater than those in the preview state, so that the mobile phone captures a raw image with sufficient brightness.

TABLE 2

| Photographing environment | Exposure time (ms) | Capture frame rate (fps) | ISO |
|---|---|---|---|
| Night-Sky | 125 | 8 | 25600 |
| Night-No light | 500 | 2 | 65535 |

In addition, the capture frame rate determined by the ISP is further related to a stability degree of the mobile phone (for example, the mobile phone is handheld or fixed on a tripod) and/or a moving speed of a moving object within the photographing range.

After detecting the photographing operation of the user, the mobile phone performs image segmentation on the generated raw image to obtain a subject image and a background image, and separately processes the subject image and the background image. A specific process is as follows:

After detecting the photographing operation of the user, the mobile phone obtains a first raw image. Optionally, the mobile phone may display the first raw image on the photographing interface, or may not display the first raw image on the photographing interface. The mobile phone performs image segmentation on the first raw image based on the subject determined in the preview state, to obtain a first subject image and a first background image. The subject image is an image of a region occupied by the subject on the raw image, and the background image is an image of the other region. For a method for performing image segmentation by the mobile phone, refer to related descriptions in the preview process. In addition, when image segmentation cannot be performed on a current raw image 1 due to a reason such as dark light, the mobile phone may prompt, on the photographing interface, the user that brightness compensation needs to be performed on the subject, and may use the flash or the screen to compensate light to illuminate the subject, so as to assist in image segmentation on the raw image 1 based on a brightness difference between the raw image 1 and a raw image 2 obtained after the brightness compensation.

In some embodiments, a mask (mask) image is formed after the image segmentation. A pixel value of a pixel in the subject image is 255, and a pixel value of a pixel in the background image is 0. The mask image is used in a subsequent fusion process of a composite image.

After capturing the first raw image, the mobile phone obtains a second raw image. The mobile phone performs image segmentation on the second raw image through segmentation described in the foregoing embodiment, to obtain a second subject image and a second background image. The mobile phone registers the second background image with the first background image, to calculate a homography matrix of the second background image. For example, the registration method may include a speeded up robust features (speeded up robust features, SURF) matching method, an SKB feature matching method, or an oriented fast and rotated brief (oriented fast and rotated brief, ORB) feature matching method. The mobile phone maps the registered second background image to the first background image based on the homography matrix, that is, overlays the second background image and the first background image, to generate a first overlaid background image. If brightness of the second subject image is lower than or equal to brightness of the first subject image, a second captured subject image (also referred to as a second intermediate subject image) is the first subject image. If brightness of the second subject image is higher than brightness of the first subject image, a second captured subject image (also referred to as a second intermediate subject image) is the second subject image. A first captured subject image may be the first subject image. That is, the second captured subject image is a frame of subject image with highest brightness in the first two frames of subject images. The mobile phone fuses the second captured subject image and the first overlaid background image to generate a first composite image, and displays the first composite image on the photographing interface, in this way, in the composite image displayed on the photographing interface, the subject image has high brightness and is clear. In the composite image generated after the background image is overlaid, the image of the still object has high brightness and is clear, and the image of the moving object may have a motion blur Herein, the image fusion method for the subject image and the background image is described by using an example in which the second subject image is fused with the first overlaid background image. A plurality of methods such as edge gradient fusion or Poisson fusion may be used for the image fusion. For example, the edge gradient fusion changes an edge of the mask image from a 0-255 two-order vertical transition to a 0 to 255 multi-order smooth transition, for example, a 0-64-128-192-255 five-order smooth transition. Then, the mask image obtained after the smooth transition is used as a weight, and the second subject image and the first overlaid background image are fused by using an alpha weighting method. Specifically, the composite image=alpha*second subject image+(1−alpha)*first overlaid background image. In addition, processing such as feathering or smoothing may be further performed during the image fusion, so that an edge transition between the subject image and the background image in the composite image generated after the fusion is smooth and natural.

After capturing the second raw image, and after capturing a third raw image, the mobile phone performs image segmentation on the third raw image based on the subject, to obtain a third subject image and a third background image. The mobile phone registers the third background image with the first background image, to calculate a homography matrix of the third background image. The mobile phone maps the registered third background image to the first overlaid background image, that is, overlays the third background image and the first overlaid background image, to generate a second overlaid background image. If brightness of the third subject image is lower than or equal to the brightness of the second captured subject image, a third captured subject image is the second captured subject image. If brightness of the third subject image is higher than the brightness of the second captured subject image, a third captured subject image is the third subject image. That is, the third captured subject image is a frame of subject image with highest brightness in the first three frames of subject images. The mobile phone fuses the third captured subject image and the second overlaid background image to generate a second composite image, and displays the second composite image on the photographing interface.

A manner in which the mobile phone processes the $i^{th}$ (i is an integer greater than 3) frame of raw image subsequently captured by the camera is similar to a manner in which the mobile phone processes the third raw image. The mobile phone performs image segmentation on the raw image based on the subject, to obtain the $i^{th}$ subject image and the $i^{th}$ background image. The mobile phone registers the background image with the first background image, to calculate a homography matrix of the $i^{th}$ background image. The mobile phone maps the registered $i^{th}$ background image to the $(i-2)^{th}$ overlaid background image, that is, overlays the $i^{th}$ background image and the $(i-2)^{th}$ overlaid background image, to generate the $(i-1)^{th}$ overlaid background image. If brightness of the $i^{th}$ subject image is lower than or equal to brightness of the captured subject image, the $i^{th}$ captured subject image is the $(i-1)^{th}$ captured subject image. If brightness of the $i^{th}$ subject image is higher than brightness of the $(i-1)^{th}$ captured subject image, the $i^{th}$ captured subject image is the $i^{th}$ subject image. That is, the $i^{th}$ captured subject image is a frame of subject image with highest brightness in the first i frames of subject images. The mobile phone fuses the $i^{th}$ captured subject image and the $(i-1)^{th}$ overlaid background image to generate the $(i-1)^{th}$ composite image, and displays the $(i-1)^{th}$ composite image on the photographing interface.

It should be noted that, in the photographing process, a time sequence of processing operations performed by the mobile phone on different raw images, such as capture, background image overlay, foreground and background image fusion, and sending an image for display (that is, sending the image to the screen for display) is not limited. For example, the mobile phone may capture a plurality of frames of raw images, then perform processing such as background image overlay and foreground and background image fusion, and send an image for display. Content displayed on the photographing interface may not correspond to a raw image in real time, that is, display on the photographing interface may lag behind the raw images in terms of time. Alternatively, the mobile phone may perform processing such as overlay and fusion each time after capturing one frame of raw image, and send an image for display.

In this way, on the photographing interface, a subject image in a composite image (for example, the first composite image, the second composite image, or the $i^{th}$ composite image) in this embodiment of this application is a frame of subject image with highest brightness in the raw images, and therefore is clear. In the composite images generated after the background images of the raw images are overlaid, an image of a static object in the background has high brightness and is clear, and a motion blur of a moving object in the background gradually generates and becomes longer. For example, T2 is 4 s. After starting photographing, the mobile phone starts a 4 s countdown. In the photographing process, as shown in (b) and (c) in FIG. 13, an image of a subject person on the photographing interface is clear, and moving vehicles in the background image have a motion blur. In addition, as a photographing time becomes longer, more background images are overlaid, and the motion blur of the vehicles becomes longer. For example, the motion blur of the vehicle shown in (c) in FIG. 13 is longer than the motion blur of the vehicle shown in (b) in FIG. 13. Although not shown in the figure, when the 4 s countdown just starts, the photographing interface may display an image in which both the subject image and the background image are clear.

In addition, in an overlay process of a plurality of frames of background images, an overlay weight of the background images may affect a motion blur of a moving object. For example, if a weight of a background image frame close to the first frame is larger, and a weight of a background image frame far away from the first frame is smaller, a motion blur of a moving object is weak. If a weight of a background image frame close to the first frame is smaller, and a weight of a background image frame far away from the first frame is larger, a motion blur of a moving object is strong.

It should be noted that exposure parameters of a single frame of raw image vary with ambient brightness. For example, ambient brightness at night is low, an exposure time of a single frame of raw image is long, and a sensitivity ISO value is small, to ensure that the single frame of raw image can be fully exposed to obtain high image brightness. If an exposure time of a single frame of raw image is long, and a quantity of frames of raw images and to-be-overlaid background images is small, the mobile phone may perform frame interpolation, so that a motion blur of a moving object in an overlaid background image is smooth, to resolve a conflict between a long exposure time and motion blur smoothness. Ambient brightness in daytime is high, an exposure time of a single frame of raw image can be short, and an ISO value can be large.

In the preview state, the mobile phone has determined a motion blur adjustment value used to indicate a quantity of overlaid frames of background images of the raw images, and a quantity of overlaid frames of background images corresponding to the motion blur adjustment value is K. Because the photographing environment is not easily changed in a short time, that is, the photographing environment is not easily changed in the preview state and in the photographing process, the mobile phone may further determine, in the preview state, an exposure time or a capture frame rate) based on a condition such as light or brightness in the current photographing environment, to estimate, based on the exposure time, whether raw images more than or equal to K frames can be obtained within the countdown photographing duration T2. If an exposure time for capturing a single frame of image by the camera is long, a capture frame rate is small, and the mobile phone determines that a quantity of raw images obtained within the countdown photographing duration T2 is less than K, a quantity of frames of background images is less than K, and it may be difficult to generate a smooth motion blur. Therefore, frame interpolation may be performed on the raw images (or frame interpolation is performed only on the background images) in the photographing process, and background images of a plurality of frames of raw images obtained after the frame interpolation are overlaid with the background images of the raw images obtained without frame interpolation (the foregoing registration and alignment operations also need to be performed before the overlay), to obtain a smooth motion blur effect.

For example, in the preview state shown in FIG. 5, if it is currently at night, light is dark, for example, illumination is 0.2 lx, and a moving speed of a vehicle in the background is high, the user sets a large motion blur adjustment value, and expects to obtain a very long motion blur. The mobile phone determines that an exposure time is 200 ms based on a condition such as light or brightness in the current photographing environment. If the quantity K of overlaid frames of background images corresponding to the motion blur adjustment value is 30, and the countdown photographing duration T2 is 4 s, 20 frames of raw images can be obtained within 4 s, and a difference from K is 10. Therefore, the mobile phone needs to perform frame interpolation on the raw images, and overlay background images on the 30 frames of the raw images obtained without frame interpolation, so that 40 frames of background images can be superimposed within the countdown photographing duration T2, to obtain a smooth motion blur effect.

There may be a plurality of image frame interpolation methods. For example, in a motion estimate and motion compensation (motion estimate and motion compensation. MEM) interpolation method, a feature association point may be selected based on correlation between images of a previous frame and a next frame and image scene content to perform dynamic point-to-point pixel motion estimation, and then a frame of image whose brightness, contrast, and continuity are consistent with those of the previous frame and the next frame is composed in the middle. The mobile phone may generate and display an image with a smooth motion blur transition through frame interpolation in the photographing process.

In addition, in the photographing process, if brightness of a subject image in a frame of raw image obtained by the mobile phone through exposure is lower than a preset brightness, the mobile phone may multiply an exposure time corresponding to the frame of raw image by an exposure compensation coefficient Tu for adjustment. If an adjusted exposure time is still less than a normal exposure time of the subject image, and brightness of a subject image in the generated raw image is still lower than the preset brightness, the mobile phone may perform light compensation by using the flash or the screen, to obtain the subject image that meets normal exposure.

It should be noted that the subject may move in a long time period. To make the subject image clear and normal bright, the mobile phone may enable the subject to obtain sufficient brightness compensation in a short time period. For example, an image frame with a short exposure time is used in the subject region, the photographer and the photographed subject are prompt not to move, and a light compensation measure such as a flash is used to increase the exposure.

204: After detecting a photographing stop operation of the user, or detecting an interruption event, or after the countdown of the photographing duration T2 ends, the mobile phone stops photographing and generates a photo.

Figure 14:
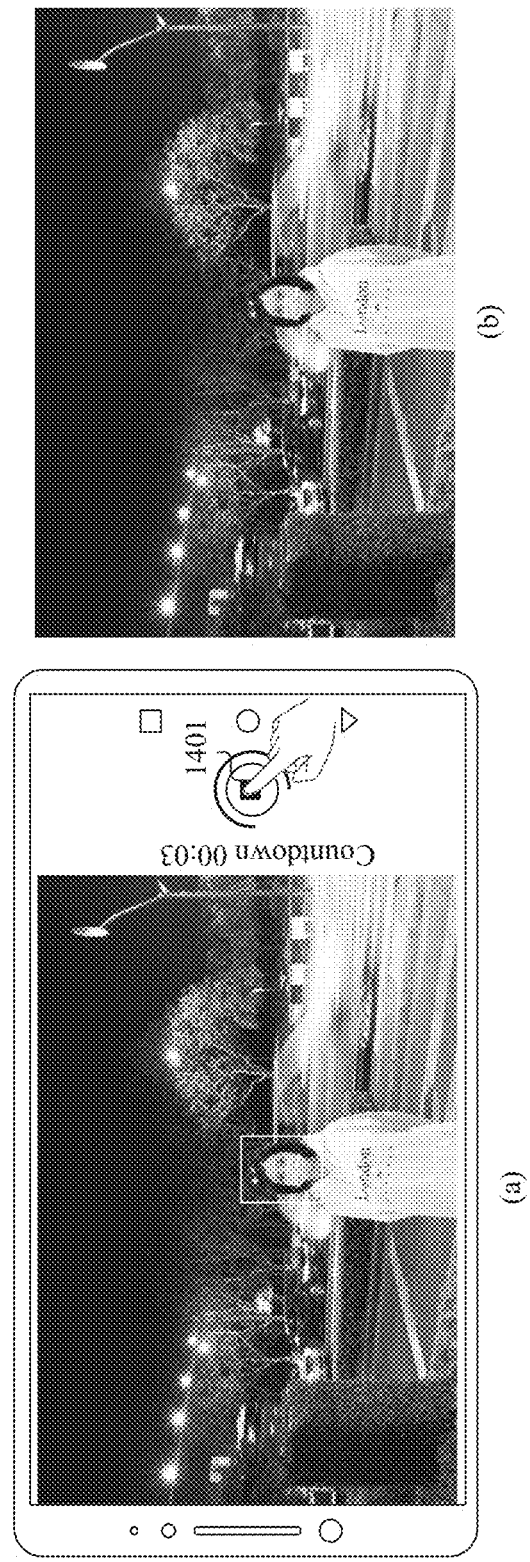
FIG. 14 is a schematic diagram of a group of a photographing interface and a photo according to an embodiment of this application.

In the photographing process, before the countdown ends, if the user considers that an effect of an image currently displayed on the photographing interface is good, the user may indicate the mobile phone to stop photographing. After detecting the photographing stop operation of the user, the mobile phone stops photographing, and a current composite image obtained through processing is a captured photo. In other words, a composite image recently generated by the mobile phone before the mobile phone stops photographing is the captured photo. In this case, a quantity of frames of raw images generated by the mobile phone is less than or equal to K, and a quantity of frames of generated composite image is less than or equal to K−1. For example, when the countdown does not end, after detecting an operation of tapping a photographing stop control 1401 in (a) in FIG. 14 by the user, the mobile phone generates a photo in which a target subject image is clear and a target background image has a motion blur, as shown in (b) in FIG. 14.

Figure 15:
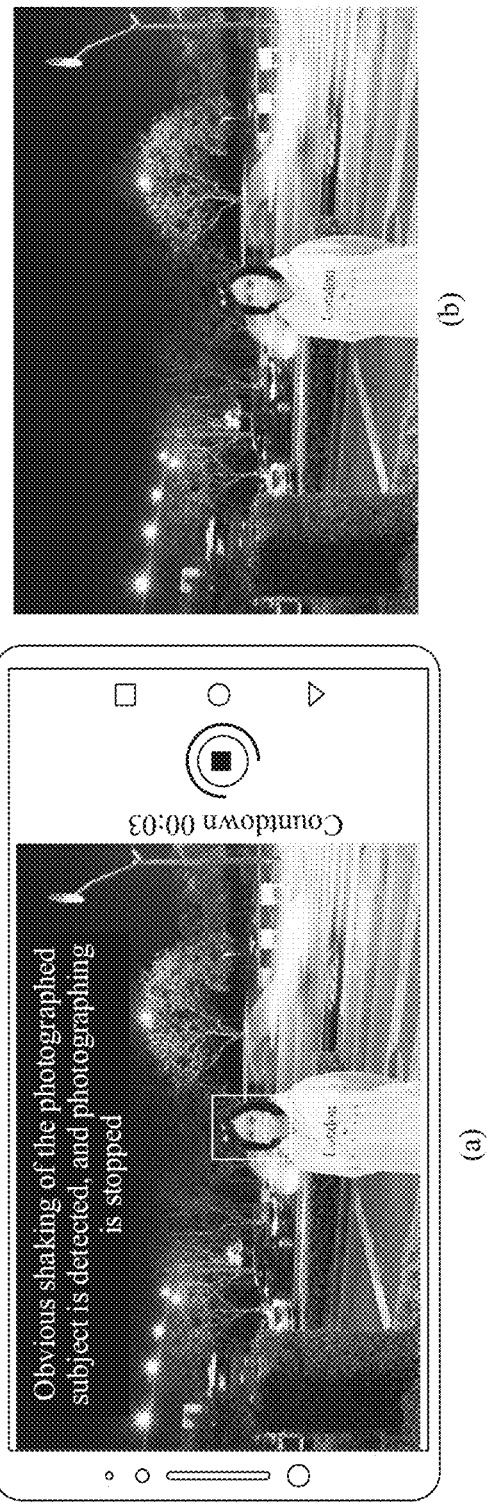
FIG. 15 is a schematic diagram of another group of a photographing interface and a photo according to an embodiment of this application.

In the photographing process, if the mobile phone detects an interrupt event that a shake (or sway) amplitude of the photographer (or the mobile phone held by the photographer) is greater than or equal to a preset value 1, or a shake (or sway) amplitude of the subject is greater than or equal to a preset value 2, the mobile phone stops photographing, and a current composite image obtained through processing is the captured photo. In the photographing process, if the shake (or sway) amplitude of the photographer or the subject is large, continuing photographing causes a blurred image. Therefore, photographing may be stopped, photographing is not continued, and a current composite image obtained through processing is used as the captured photo. In this case, a quantity of flames of raw images generated by the mobile phone is less than or equal to K, and a quantity of frames of generated composite image is less than or equal to K−1. In some embodiments, if the mobile phone detects the interruption event, the mobile phone may further prompt the user. For example, as shown in (a) in FIG. 15, When the countdown does not end, the mobile phone prompts the user with "Obvious shaking of the photographed subject is detected, and photographing is stopped", and generates a photo shown in (h) in FIG. 15.

For example, in the photographing process, the mobile phone may track the subject. If a center of a subject location deviates due to motion and a deviation exceeds in pixels, it may indicate that the current photographer or the subject shakes (or sways) greatly, and an interruption event is detected. Therefore, the mobile phone triggers an interruption mechanism to interrupt a current photographing operation, so as to stop photographing. In some technical solutions, the mobile phone may further prompt the user with a reason for interrupting photographing, and prompt the user not to move in the photographing process in the slow shutter exposure mode.

For example, the mobile phone may detect, by using a component such as a gyroscope, whether the mobile phone shakes (or sways). If the mobile phone shakes (or sways), it may indicate that the photographer holding the mobile phone shakes (or sways). For example, the mobile phone may calculate rotation angles of the mobile phone on three axes X, Y, and Z within the photographing duration T2. When the rotation angle exceeds a rotation angle threshold, it is determined that a shake (or sway) amplitude of the photographer is excessively large, and the mobile phone stops photographing.

For example, the mobile phone may detect motion of the subject by using a motion estimation method. The mobile phone may detect a feature point of the subject by using a corner point detection algorithm such as SUSAN, Harris, SURF, SIFT, or Shi-Tomasi, and then estimate the motion of the subject by using an optical flow method or a block-matching algorithm, to estimate a deviation caused by the motion of the subject. When the deviation of the subject exceeds a deviation threshold, the mobile phone determines that the shake (or sway) amplitude of the subject is excessively large, and therefore stops photographing.

Figure 16:
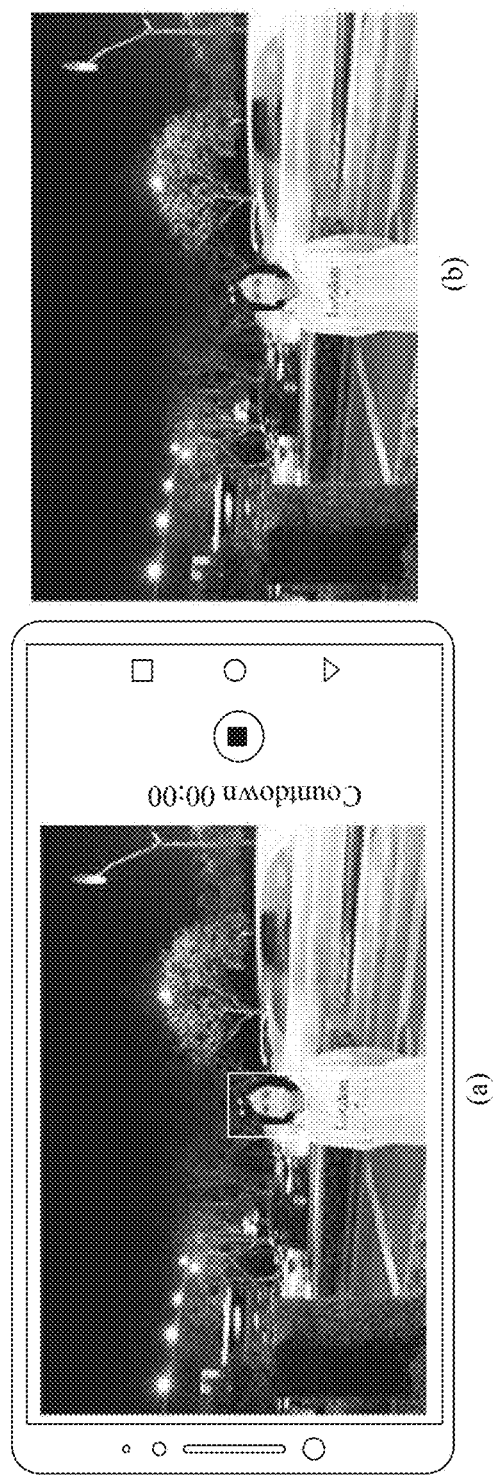
FIG. 16 is a schematic diagram of another group of a photographing interface and a photo according to an embodiment of this application.

If before the countdown of the photographing duration T2 ends, the mobile phone detects neither the interruption event nor the operation of stopping photographing by the user, the mobile phone stops photographing after the countdown of the photographing duration T2 ends, A composite image obtained through processing in this case is the captured photo. In a case without frame interpolation, a quantity of frames of raw images generated by the mobile phone is equal to K, and a quantity of frames of generated composite images is equal to K−1. In a case with frame interpolation, a SUM of a quantity of frames of raw images and a quantity of frames of interpolated images obtained by the mobile phone is equal to K, and a quantity of frames of composite images generated by the mobile phone is equal to K−1. For example, after the countdown ends, as shown in (a) in FIG. 16, for a photo taken by the mobile phone, refer to (b) in FIG. 16.

As described above, in the preview state, the mobile phone has determined the motion blur adjustment value used to indicate the quantity of overlaid frames in the background image in the photographing process. Therefore, in the photographing process, within the photographing duration T2, the mobile phone obtains K frames of raw images corresponding to the motion blur adjustment value (or obtain through frame interpolation), and overlays K frames of background images. In other words, the mobile phone may overlay background images on the K frames of raw images to generate the $(K-1)^{th}$ overlaid background image, and the mobile phone generates the $(K-1)^{th}$ composite image based on the $(K-1)^{th}$ overlaid background image. The $(K-1)^{th}$ composite image is the captured photo.

It should be noted that, in the photographing process, actual duration T in which the mobile phone obtains the K frames of raw images may be less than or equal to T2. A larger motion blur adjustment value indicates larger T, and a smaller motion blur adjustment value indicates smaller T. If T is less than T2, after the duration T, the mobile phone stops obtaining raw images. However, after the duration T2, the countdown ends, and the mobile phone ends the photographing process and generates the photo.

It should be noted that, in the photographing process, the mobile phone performs processing such as segmentation, overlay, and fusion on raw images generated in real time, and displays a fused composite image on the photographing interface in real time. Therefore, in a technical solution, the countdown photographing duration T2 includes capture duration (the capture duration is duration in which the camera captures an image corresponding to the raw image) and processing duration of the K frames of raw images in the photographing process. Capture and processing of the K frames of raw images are completed when the countdown ends or before the countdown ends. In another technical solution, the countdown photographing duration T2 includes capture duration of the K frames of raw images and processing duration of the first K−1 frames of raw images in the photographing process. That is, after the $K^{th}$ frame of raw image is captured, the countdown ends, and the mobile phone processes the $K^{th}$ raw image after the countdown ends, to generate a last frame of composite image (that is, the captured photo). In another technical solution, the countdown photographing duration T2 includes capture duration of the K frames of raw images in the photographing process. After the countdown ends, the mobile phone may continue to perform image processing to generate a last frame of composite image (that is, the captured photo).

In this way, the photo captured by the mobile phone includes a target subject image and a target background image. The target subject image is a frame of subject image with highest brightness in subject images of the raw images. The target background image is an image formed by overlaying background images of the plurality of frames of raw images. The target subject image has high brightness and is clear. An image of a still object in the target background image has high brightness and is clear, and an image of a moving object in the target background image has a motion blur. The photographing method provided in this embodiment of this application is applicable to a scene in which a moving object exists in a background range of the photographed subject.

In particular, the method provided in this embodiment of this application is applicable to a scene in which a moving object exists in the background range of the subject, the subject is required to keep still in the photographing process, and the subject (for example, a person) is actually prone to shake. When the subject is prone to shake, if cumulative overlay is performed on the raw images, the subject image is also blurred when a motion blur is generated on the background image. In the photographing method provided in this embodiment of this application, the mobile phone obtains the subject images and the background images in the raw images through segmentation, and separately performs cumulative overlay on the background images to generate the motion blur of the moving object, but does not perform cumulative overlay on the entire raw images. Therefore, cumulative overlay is not performed on the subject images in the raw images, and a blurred subject image caused by the shake of the subject and cumulative overlay of the subject images is avoided. In addition, a frame of a subject image with highest brightness is used as the target subject image in the photo, so that the target subject image is not blurred, and a clear subject image can be obtained. The user may obtain, by using the mobile phone, a photo in which a subject image is clear and a background image has a motion blur through one-click photographing, so that slow shutter photographing is simple and convenient. In addition, the mobile phone may further perform image stabilization through electronic image stabilization and the foregoing registration operation, so that the mobile phone can still capture a photo in which a subject image is clear and a background image has a motion blur when the photographer or the subject shakes (or sways) slightly; to reduce difficulty in slow shutter photographing by the user.

It should be noted that slow shutter photographing of a professional camera such as a single-lens reflex camera or an existing mobile terminal causes a motion blur of all moving objects in a picture without distinguishing between a foreground and a background. In other words, a moving subject and a background object each have a motion blur. If the user wants to take a photo in which a subject is clear and a moving object has a motion blur, a hand of the photographer and the photographed subject such as a photographed person need to keep still strictly. This is difficult to achieve because the photographer or the subject such as the photographed person is prone to shake (or sway). However, in the photographing method provided in this embodiment of this application, even if the photographer or the photographed subject slightly shakes or sways, the mobile phone can capture, through segmentation of the foreground subject and the background and overlay of a plurality of frames of background images, a photo in which a foreground subject is a clear and a background moving object has a motion blur, to reduce photographing requirements for the photographer and the photographed subject, and reduce difficulty in slow shutter photographing.

In some other embodiments, the subject image in the composite image displayed on the photographing interface is a frame of subject image with highest brightness in the raw images, or a subject image in a raw image generated in real time in the photographing process, or an image obtained after multi-frame fusion is performed on first i subject images in the raw images in the photographing process. For example, a plurality of image fusion methods such as a fusion method based on a weighted average, a fusion method based on a larger absolute value, and an image fusion method based on wavelet transform may be used for fusion of a plurality of frames of subject images. The target subject image in the photo may be an image generated after registration and overlay are performed on a subject image 1 with highest brightness and the nearby M frames of subject images in the subject images of the K frames of raw images. Capture duration of M frames of raw images is less than the preset duration T1.

Different subject images in the raw images may be overlaid by using equal weight values or unequal weight values. When unequal weight values are used, the mobile phone may make a weight value of some frames of subject images with a longer exposure time or more light compensation greater, and a weight value of other frames of subject images smaller, to improve definition of subject details on the subject image when brightness of the subject image after overlay is sufficient.

The photographing process described in step 203 and step 204 corresponds to the cases described in Solution 1 to Solution 3. In the solution described in Solution 4, after detecting the photographing operation of the user, if a moving object is detected within the photographing range, the mobile phone performs the processing method of the raw image described in step 203 and step 204.

In the solution described in Solution 4, after detecting the photographing operation of the user, if no moving object is detected within the photographing range, the mobile phone may prompt, on the photographing interface, the user that no moving object is detected and an image with a motion blur cannot be generated. In a technical solution, the mobile phone stops photographing and generates a photo after the countdown photographing duration T2 ends, or after detecting a photographing stop operation of the user, or after detecting an interruption event, where the photo has no motion blur of a moving object. In another technical solution, after detecting a photographing operation of the user, the mobile phone captures a photo in the same way as in the normal photo mode. In addition, the mobile phone may further prompt the user that a photo with a motion blur cannot be captured because there is no moving object, and a normal photo has been captured.

In addition, in softie embodiments of this application, after stopping photographing, the mobile phone stores a captured photo with a motion blur, and displays a thumbnail 1 of the photo. After detecting an operation of tapping the thumbnail 1 by the user, the mobile phone magnifies and displays the photo, where the photo includes a subject image and a background image.

A thumbnail of a photo captured in the slow shutter exposure mode has a motion blur of a moving object, and the user may see the motion blur of the moving object from the thumbnail. For example, the thumbnail 1 may be a thumbnail 1701 shown in (a) in FIG. 17. In some technical solutions, there is a prompt mark on a thumbnail of a photo having a motion blur, to distinguish the photo from another photo having no motion blur. For example, as shown in (a) in FIG. 17, the prompt mark is a text mark 1702.

In some other embodiments, after stopping photographing, the mobile phone may further store an image sequence corresponding to the photo with the motion blur. The image sequence includes a series of composite images (for example, the first composite image, the second composite image, and the $i^{th}$ composite image) generated in the photographing process. For example, after detecting an operation of tapping the thumbnail 1 by the user, the mobile phone magnifies and displays the photo. After detecting an operation of double tapping (or an operation such as touching and holding different from tapping) the thumbnail 1 by the user, the mobile phone plays the image sequence, that is, displays a dynamic change effect of the composite image in a process of generating the photo. For another example, after detecting an operation that the user taps to open the thumbnail 1, the mobile phone magnifies and displays the photo. Then, after detecting an operation that the user touches and holds the photo, the mobile phone plays the image sequence.

Alternatively, the image sequence corresponds to a thumbnail 2, and after detecting an operation that the user taps the thumbnail 2, the mobile phone plays the image sequence. The image sequence is similar to a dynamic picture or a small video. In some technical solutions, the thumbnail 2 includes a play control, and after detecting an operation of tapping the play control by the user, the mobile phone plays the image sequence corresponding to the thumbnail 2. A position of the play control on the thumbnail 2 may be different from a position of a play control on a video thumbnail, so that the user can distinguish between the image sequence obtained in the slow shutter exposure mode and a video. For example, the play control on the video thumbnail is located in the middle of the thumbnail, and the play control on the thumbnail 2 may be located in the upper left corner, the upper right corner, the lower left corner, the lower right corner, or the like of the thumbnail 2.

Figure 17:
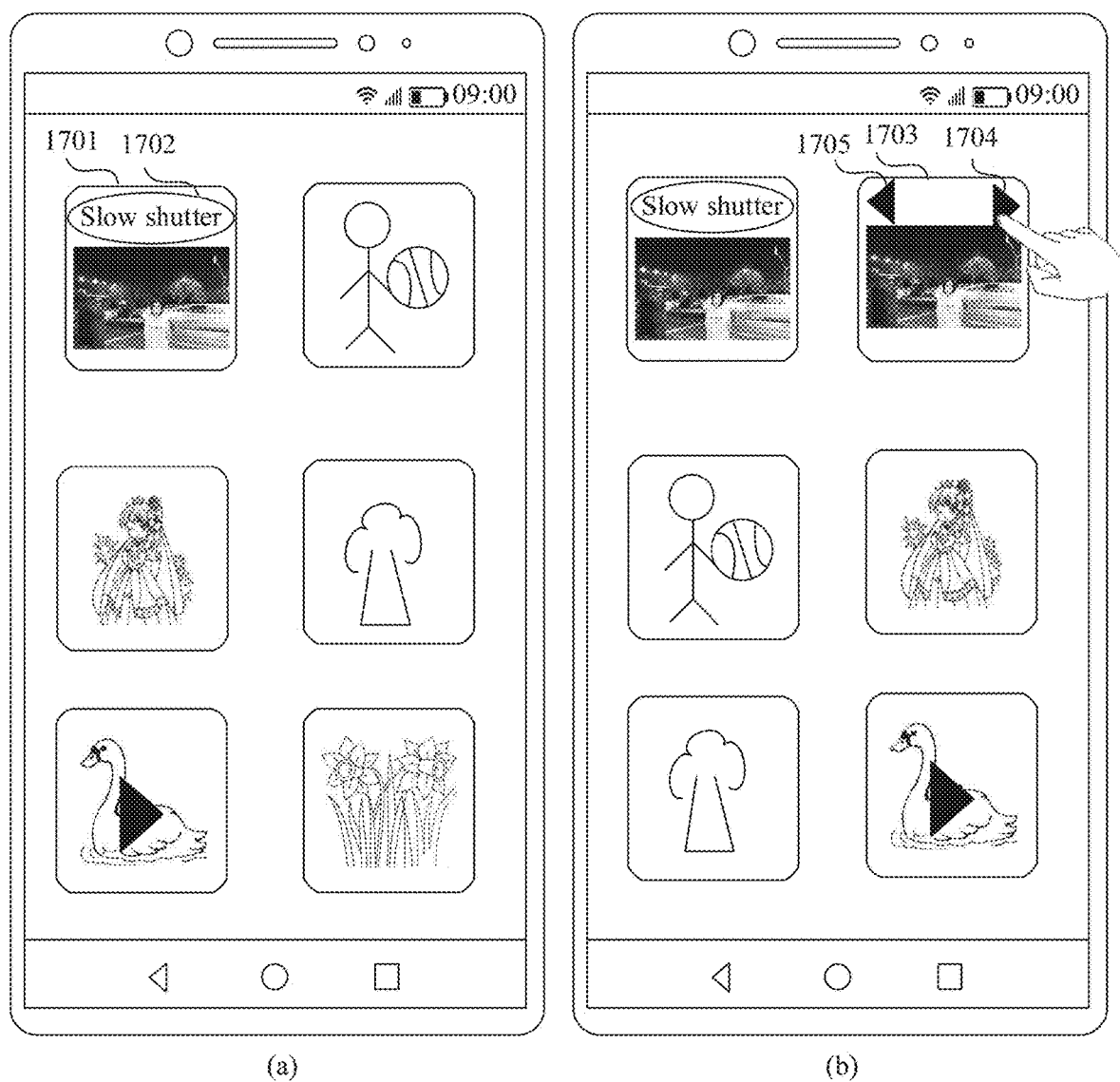
FIG. 17 is a schematic diagram of another group of interfaces according to an embodiment of this application.
Figure 18:
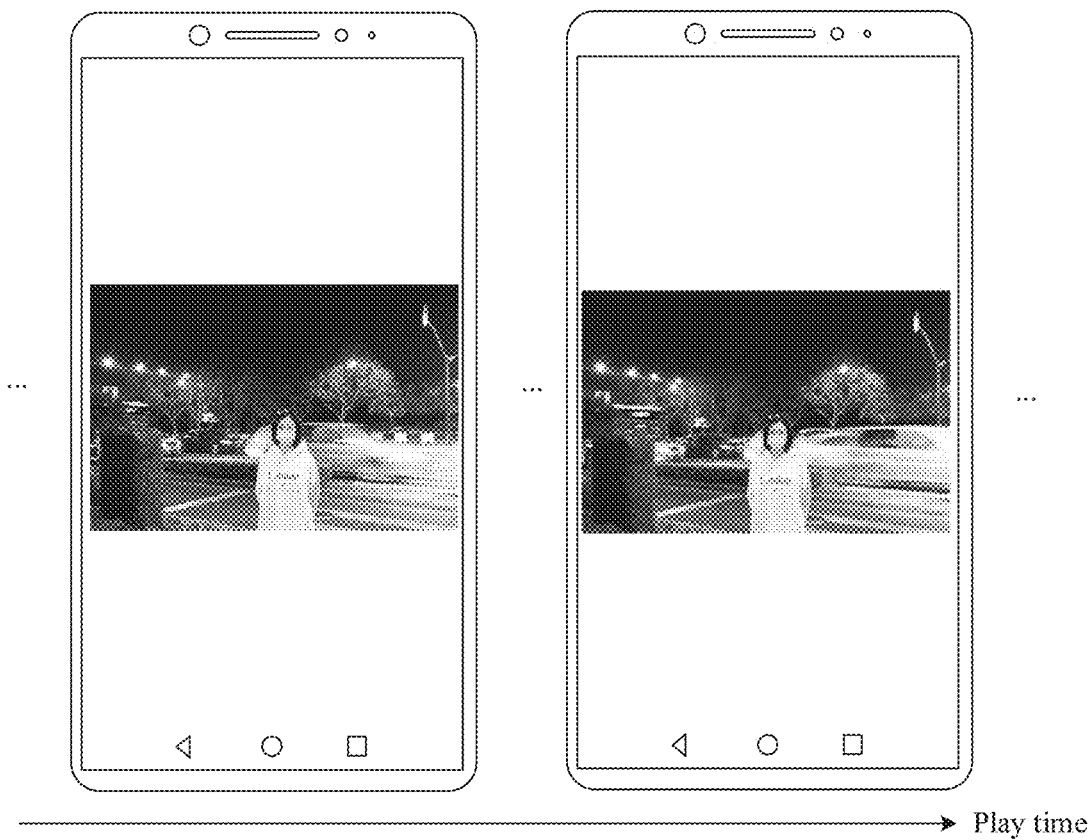
FIG. 18 is a schematic diagram of a playback effect of an image sequence according to an embodiment of this application.

For example, the thumbnail 2 may be a thumbnail 1703 shown in (b) in FIG. 17, and the thumbnail 1703 includes a play control 1704 located in the upper right corner. After the mobile phone detects an operation of tapping the play control 1704 by the user, as shown in FIG. 18, the mobile phone plays a corresponding image sequence (that is, in forward order).

In some other technical solutions, the thumbnail 2 further includes a play control used to play the image sequence corresponding to the thumbnail 2 in reverse order. For example, the thumbnail 1703 further includes a play control 1705 located in the upper left corner. After detecting an operation of tapping the play control 1705 by the user, the mobile phone plays a corresponding image sequence in reverse order, In some other embodiments, the image sequence stored in the mobile phone may be edited. After entering an editing mode, the mobile phone may determine a target object based on an indication operation of the user, retain an image of the target object (for example, a subject and/or a moving object) in the image sequence, and delete an image in another region. In this way, when playing the image sequence, the mobile phone may display only a dynamic change effect of the target object in the photographing process. For example, the target object is a vehicle in the background image, and the mobile phone retains only an image region in which the vehicle in the image sequence is located, so that when the image sequence is played, only a dynamic effect of an increasingly; long motion blur of the vehicle in the photographing process is displayed. For another example, the target object includes a subject person in the subject image and a vehicle in the background image, and the mobile phone retains only an image region in which the subject person and the vehicle in the image sequence are located, so that an effect that the subject person does not move, the background vehicles shuttle, and a motion blur becomes longer can be demonstrated when the image sequence is played.

In some other embodiments, the mobile phone may further store the K frames of raw images captured in the photographing process. In addition, the photo that has the motion blur and that is captured by the mobile phone in the slow shutter exposure mode may be further edited and modified. For example, after entering an editing mode of the photo, the mobile phone may operate, based on an indication of the user, to shorten, lengthen, weaken, or enhance the motion blur of the moving object in the photo. For example, when the user indicates to shorten the motion blur of the moving object, the mobile phone may extract the first several frames or the last several flames in the K flames of raw images corresponding to the photo, and process remaining frames of raw images according to the processing method in the photographing process described in step 203, to obtain an image effect with a short motion blur. For another example, when the user indicates to lengthen the motion blur of the moving object, the mobile phone may perform frame interpolation after the K frames of raw images corresponding to the photo, and process, according to the processing method in the photographing process described in step 203, the frames of raw images obtained after the frame interpolation, to obtain an image effect with a lengthened motion blur. For another example, when the user indicates to weaken the motion blur of the moving object, the mobile phone may perform uniform frame extraction on the K frames of raw images corresponding to the photo, and process, according to the processing method in the photographing process described in step 203, the frames of raw images obtained after the frame extraction, to obtain an image effect with a weakened motion blur. For another example, when the user indicates to enhance the motion blur of the moving object, the mobile phone may perform uniform frame interpolation on the K frames of raw images corresponding to the photo, and process, according to the processing method in the photographing process described in step 203, the frames of raw images obtained after the frame interpolation, to obtain an image effect with an enhanced motion blur. For another example, after entering the editing mode, the mobile phone may perform processing such as replacing a subject, adding a subject, deleting an object in the background, or replacing the background on the photo based on an indication operation of the user.

In addition, in some other embodiments of this application, after detecting the photographing operation of the user, the mobile phone may immediately generate a photo. In some technical solutions, after the mobile phone detects the photographing operation of the user, a preview image obtained through current processing is a captured photo. For example, the operation may be an operation of double tapping a photographing button. Alternatively, the photographing interface includes an immediate photographing control. When determining that a photographing effect on the preview interface is good, the user taps the immediate photographing control, to retain a current preview image on the preview interface and capture a photo. In some other technical solutions, the photo may be a screenshot of a currently displayed preview image when the mobile phone detects the photographing operation of the user. In the preview state, when an effect of the preview image displayed on the preview interface is good, the user may perform the photographing operation, to immediately capture a photo.

It may be understood that, to implement the foregoing functions, the electronic device includes a corresponding hardware structure and/or software module for performing each function. Algorithm steps in the examples described with reference to embodiments disclosed in this specification can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application with reference to the embodiments, but it should not be considered that the implementation goes beyond the scope of this application.

In the embodiments, the electronic device may be divided into function modules based on the example in the foregoing method. For example, each function module corresponding to each function may be obtained through division, or two or more functions may be integrated into one processing module. The integrated module may be implemented in the form of hardware. It should be noted that, in the embodiments, division into the modules is an example, and is merely a logical function division. In an actual implementation, another division manner may be used.

Figure 19:
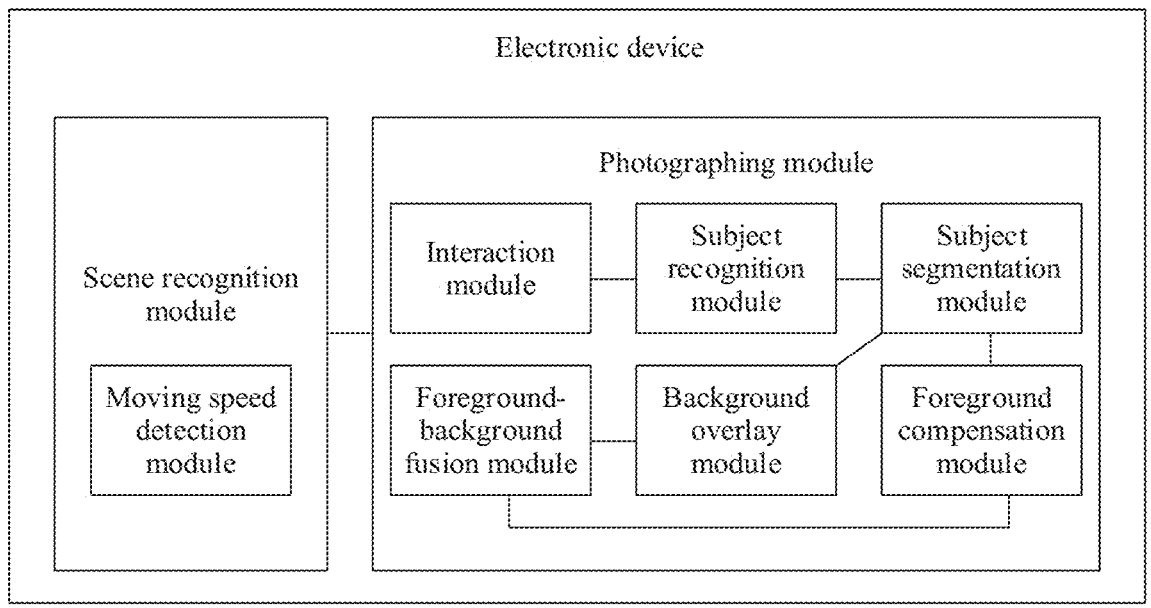
FIG. 19 is a schematic diagram of modules of an electronic device according to an embodiment of this application.

For example, in a division manner, as shown in FIG. 19, the electronic device may include a scene recognition module and a photographing module. The scene recognition module includes a moving speed detection module and the like. The photographing module includes an interaction module, a subject recognition module, a subject segmentation module, a foreground compensation module, a background overlay module, a foreground-background fusion module, and the like.

In this embodiment of this application, the scene recognition module is configured to recognize whether a scene is a slow shutter photographing scene. The moving speed detection module in the scene recognition module is configured to detect whether a moving object exists in a photographing scene. The interaction module is configured to perform an interaction operation with a user, for example, display a preview interface and a photographing interface for the user, detect an operation of entering/exiting a slow shutter exposure mode by the user, detect a photographing operation of the user, or display prompt information for the user. The subject recognition module is configured to recognize a subject. For example, the subject is a person or an animal. The subject segmentation module is configured to perform image segmentation on a raw image obtained by the camera, to distinguish between a subject image of a region occupied by a subject and a background image of another region. The foreground compensation module is configured to perform light compensation on the foreground subject, to capture a subject image with sufficient brightness. The background overlay module is configured to overlay background images in raw images to generate a target background image with a motion blur. The foreground-background fusion module is configured to fuse a subject image (for example, a subject image with highest brightness or a subject image generated by overlaying M frames of subject images) and an overlaid background image (for example, a first overlaid background image or a second overlaid background image) into a composite image.

Embodiments of this application further provide an electronic device, including one or more processors and one or more memories. The one or more memories are coupled to the one or more processors. The one or more memories are configured to store computer program code, and the computer program code includes computer instructions. When the one or more processors execute the computer instructions, the electronic device is enabled to perform the foregoing related method steps, to implement the photographing method in the foregoing embodiment.

Embodiments of this application further provide a computer-readable storage medium. The computer-readable storage medium stores computer instructions. When the computer instructions are run on an electronic device, the electronic device is enabled to perform the related method steps, to implement the photographing method in the foregoing embodiment.

Embodiments of this application further provide a computer program product. When the computer program product is run on a computer, the computer is enabled to perform the foregoing related steps, to implement the photographing method performed by the electronic device in the foregoing embodiment.

In addition, embodiments of this application further provide an apparatus. The apparatus may be specifically a chip, a component, or a module. The apparatus may include a processor and a memory that are connected. The memory is configured to store computer-executable instructions, and when the apparatus runs, the processor may execute the computer-executable instructions stored in the memory, so that the chip performs the photographing method performed by the electronic device in the foregoing method embodiment.

The electronic device, the computer-readable storage medium the computer program product, or the chip provided in embodiments is configured to perform the corresponding method provided above. Therefore, for beneficial effects that can be achieved, refer to the beneficial effects in the corresponding method provided above. Details are not described herein again.

The foregoing descriptions about implementations allow a person skilled in the art to understand that, for convenient and brief description, division into the foregoing function modules is taken as an example for illustration. In actual application, the foregoing functions can be allocated to different modules and implemented according to a requirement, in other words, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, division into the modules or units is merely logical function division and may be other division in an actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and components displayed as units may be one or more physical units, that is, may be located in one place, or may be distributed on a plurality of different places. Some or all of the units may be selected based on actual requirements to achieve the objectives of the solutions of embodiments.

In addition, function units in embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in embodiments of this application. The foregoing storage medium includes any medium that can store program code, such as a USB flash drive, a removable hard disk, a read-only memory (read-only memory, ROM), a random access memory random access memory, RAM), a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method applied to an electronic device having a camera, wherein the method comprises:
   entering a photo mode;
   automatically entering, when detecting a moving object within a photographing range, a target photographing mode;
   displaying a first preview image on a preview interface of the electronic device, wherein the first preview image comprises a preview subject image and a preview background image, wherein an image of a first object in the preview background image has a motion blur, and wherein the preview subject image does not have a motion blur;
   displaying an intermediate image on a photographing interface of the electronic device after detecting a photographing operation, wherein the intermediate image comprises an intermediate subject image and an intermediate background image, wherein an image of a second object in the intermediate background image has a motion blur, and wherein the intermediate subject image does not have a motion blur;
   stopping photographing; and
   generating a photo, wherein the photo comprises a target subject image and a target background image,
   wherein an image of the second object in the target background image has a motion blur, and
   wherein the target subject image does not have a motion blur.

2. The method of claim 1, wherein detecting the moving object within the photographing range comprises detecting the moving object within a background range of the photographing range.

3. The method of claim 1, wherein after entering the target photographing mode, the method further comprises:
   generating a RAW image based on an image captured by the camera;
   displaying the RAW image on the preview interface;
   recognizing a subject based on the RAW image; and
   prompting a user that the subject is recognized.

4. The method of claim 3, further comprising:
   prompting, when not recognizing the subject, the user to specify a subject;
   determining the subject based on an indication operation of the user on an object in the RAW image; and
   prompting the user that the subject is recognized.

5. The method of claim 3, wherein displaying the first preview image on the preview interface comprises:
   performing image segmentation on a plurality of generated frames of RAW images based on the subject;
   separately obtaining a subject image and a background image, wherein the subject image comprises the subject, and wherein the background image comprises the first object that moves;
   registering and overlaying background images in an $i^{th}$ group of N adjacent frames of RAW images to generate a preview background image i, wherein i is a positive integer, wherein N is an integer greater than 1, and wherein an image of the first object in the preview background image i has a motion blur, wherein a middlemost frame of subject image or a frame of subject image close to the middle in the $i^{th}$ group of N adjacent frames of RAW images is a preview subject image i, or a subject image in a last captured frame of RAW image in the N adjacent frames of RAW images is the preview subject image i;
   fusing the preview background image i and the preview subject image i to generate a preview image i; and
   displaying the preview image i on the preview interface,
   wherein the preview image i is the first preview image,
   wherein when i is two consecutive integers, two adjacent groups of N frames of RAW images are slid in a sliding window mode.

6. The method of claim 1, wherein the preview interface comprises one or more of the following:
   first prompt information prompting that the target photographing mode has been entered;
   second prompt information prompting a photographer and a subject to keep still after the photographing is started;
   third prompt information prompting that a countdown is performed after the photographing is started;
   fourth prompt information prompting a speed of a moving object; and
   fifth prompt information prompting a recommended rate value, wherein the recommended rate value is used to indicate a quantity K of overlaid frames of background images in a photographing process after the photographing is started.

7. The method of claim 1, wherein the preview interface further comprises a rate control that sets a rate value, and wherein the rate value indicates a quantity K of overlaid frames of background images in a photographing process after the photographing is started.

8. The method of claim 1, wherein the photographing interface comprises one or more of the following:
   sixth prompt information prompting a photographer and a subject to keep still after the photographing is started; and
   seventh prompt information prompting the subject.

9. The method of claim 1, further comprising:
   starting, after detecting the photographing operation, a countdown of a first duration using a countdown control of the photographing interface; and
   prompting a user with a remaining duration of the countdown,
   wherein the stopping photographing comprises:
      stopping photographing before the countdown ends when a photographing stop operation is detected;
      stopping photographing before the countdown ends when detecting that a shake amplitude of the electronic device is greater than or equal to a first preset value or a shake amplitude of a subject is greater than or equal to a second preset value; or
      stopping photographing after the countdown ends.

10. The method of claim 9, wherein the first duration is associated with one or more of the following: a moving speed of the first object, a capture frame rate of the camera, or a rate value, and wherein the rate value indicates a quantity K of overlaid frames of background images in a photographing process after the photographing is started.

11. The method of claim 9, wherein displaying the intermediate image on the photographing interface after detecting the photographing operation comprises:
   generating, after detecting the photographing operation, a first RAW image based on the image captured by the camera;
   performing image segmentation on the first RAW image to obtain a first subject image and a first background image;
   generating, after detecting the photographing operation, a $j^{th}$ RAW image based on the image captured by the camera, wherein j is an integer greater than 1 and less than or equal to K, wherein K corresponds to a rate value, and wherein the rate value indicates a quantity K of overlaid frames of background images in a photographing process after the photographing is started;

performing image segmentation on the $j^{th}$ RAW image to obtain a $j^{th}$ subject image and a $j^{th}$ background image;

registering the $j^{th}$ background image and the first background image;

overlaying the $j^{th}$ background image and the $(j-2)^{th}$ overlaid background image to obtain the $(j-1)^{th}$ overlaid background image, wherein the $(j-2)^{th}$ background image comprises the second object, wherein an image of the second object has a motion blur, and wherein when j is 2, the $(j-2)^{th}$ overlaid background image is the first background image, wherein the $j^{th}$ intermediate subject image is a frame of subject image with highest brightness in frames of subject images;

fusing the $(j-1)^{th}$ overlaid background image and the $j^{th}$ intermediate subject image to generate the $(j-1)^{th}$ composite image; and displaying the $(j-1)^{th}$ composite image on the photographing interface, wherein the $(j-1)^{th}$ composite image is the intermediate image.

12. The method of claim 11, further comprising:

determining that a quantity of frames of images captured by the camera in the first duration is less than K; and performing, after the photographing operation is detected, frame interpolation on the first RAW image that is generated based on the image captured by the camera to obtain K frames of RAW images in the first duration.

13. The method of claim 11, wherein the photo is the $(j-1)^{th}$ composite image recently generated before the photographing is stopped, wherein when the photographing is stopped before the countdown ends, j is less than or equal to K, or wherein when the photographing is stopped after the countdown ends, j is equal to K.

14. The method of claim 1, wherein a subject is one person, or wherein the subject is a plurality of persons with a same depth of field.

15. An electronic device, comprising:

a camera configured to capture an image;

a memory configured to store one or more computer programs comprising instructions; and one or more processors coupled to the memory and the camera, wherein the one or more processors are configured to execute the instructions and enable the electronic device to:

enter a photo mode;

automatically enter, when detecting a moving object within a photographing range, a target photographing mode;

display a first preview image on a preview interface, wherein the first preview image comprises a preview subject image and a preview background image, wherein an image of a first object in the preview background image has a motion blur, and wherein the preview subject image does not have a motion blur;

display an intermediate image on a photographing interface after detecting a photographing operation, wherein the intermediate image comprises an intermediate subject image and an intermediate background image, wherein an image of a second object in the intermediate background image has a motion blur, and wherein the intermediate subject image does not have a motion blur; and stop photographing and generating a photo, wherein the photo comprises a target subject image and a target background image, wherein an image of the second object in the target background image has a motion blur, and wherein the target subject image does not have a motion blur.

16. The electronic device of claim 15, wherein the electronic device is further enabled to detect the moving object within a background range of the photographing range.

17. The electronic device of claim 15, wherein the electronic device is further enabled to:

generate a RAW image based on an image captured by the camera;

display the RAW image on the preview interface;

recognize a subject based on the RAW image; and prompt a user that the subject is recognized.

18. The electronic device of claim 17, wherein the electronic device is further enabled to:

prompt, when not recognizing the subject, the user to specify a subject;

determine the subject based on an indication operation of the user on an object in the RAW image; and prompt the user that the determined subject is recognized.

19. A method applied to an electronic device having a camera, wherein the method comprises:

entering a target photographing mode;

displaying a first preview image on a preview interface of the electronic device, wherein the first preview image comprises a preview subject image and a preview background image, wherein an image of a first object in the preview background image has a motion blur, wherein the preview subject image does not have a motion blur, and wherein the preview interface further comprises a rate control that sets a rate value, and wherein the rate value indicates a quantity K of overlaid frames of background images in a photographing process after photographing is started;

displaying an intermediate image on a photographing interface of the electronic device after detecting a photographing operation, wherein the intermediate image comprises an intermediate subject image and an intermediate background image, wherein an image of a second object in the intermediate background image has a motion blur, and wherein the intermediate subject image does not have a motion blur;

stopping the photographing; and generating a photo, wherein the photo comprises a target subject image and a target background image, wherein an image of the second object in the target background image has a motion blur, and wherein the target subject image does not have a motion blur.

20. The method of claim 19, wherein before entering the target photographing mode, the method further comprises:

entering a photo mode; and automatically entering, when detecting a moving object within a photographing range, the target photographing mode.

* * * * *

UNITED STATES PATENT AND TRADEMARK OFFICE
CERTIFICATE OF CORRECTION

PATENT NO. : 12,356,063 B2  
APPLICATION NO. : 17/923276  
DATED : July 8, 2025  
INVENTOR(S) : Lei Wu et al.

Page 1 of 1

It is certified that error appears in the above-identified patent and that said Letters Patent is hereby corrected as shown below:

In the Claims

Claim 11, Column 43, Line 16: "in frames of" should read "in j frames of"

Signed and Sealed this  
Nineteenth Day of August, 2025

Coke Morgan Stewart  
*Acting Director of the United States Patent and Trademark Office*